US011168440B2

(12) United States Patent
Onizuka et al.

(10) Patent No.: US 11,168,440 B2
(45) Date of Patent: Nov. 9, 2021

(54) METHOD FOR PRODUCING COMPOSITE MATERIAL

(71) Applicant: NITTA CORPORATION, Osaka (JP)

(72) Inventors: Maki Onizuka, Osaka (JP); Takuji Komukai, Osaka (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 16/571,505

(22) Filed: Sep. 16, 2019

(65) Prior Publication Data

US 2020/0040518 A1 Feb. 6, 2020

Related U.S. Application Data

(63) Continuation of application No. 14/786,722, filed as application No. PCT/JP2014/061395 on Apr. 23, 2014, now Pat. No. 10,458,061.

(30) Foreign Application Priority Data

Apr. 24, 2013 (JP) ................................ 2013-091518
Apr. 24, 2013 (JP) ................................ 2013-091519
(Continued)

(51) Int. Cl.
*D06M 11/74* (2006.01)
*C08J 5/00* (2006.01)
(Continued)

(52) U.S. Cl.
CPC ............ *D06M 11/74* (2013.01); *B82Y 30/00* (2013.01); *C08J 5/005* (2013.01); *C08J 5/042* (2013.01); *D06M 2101/40* (2013.01)

(58) Field of Classification Search
CPC .... D06M 11/74; D06M 2101/40; C08J 5/005; C08J 5/042; B82Y 30/00; B82Y 40/00
See application file for complete search history.

(56) References Cited

U.S. PATENT DOCUMENTS 7,867,468 B1 1/2011 Haddon et al.
2006/0052509 A1* 3/2006 Saitoh .................... C08L 65/00 524/496
(Continued)

FOREIGN PATENT DOCUMENTS

JP 2003-239171 A 8/2003
JP 2005-264400 A 9/2005
(Continued)

OTHER PUBLICATIONS

Machine translation of JP-2013076198-A. (Year: 2013).*
(Continued)

*Primary Examiner* — Michael P Wieczorek
(74) *Attorney, Agent, or Firm* — Muncy, Geissler, Olds & Lowe, P.C.

(57) ABSTRACT

A method for producing a composite material includes: preparing a dispersion, in which carbon nanotubes are dispersed without adding a dispersant or an adhesive; giving mechanical energy to the dispersion to create a reversible reaction condition in the dispersion, in which a dispersion state of the carbon nanotubes and an aggregation state of the carbon nanotubes are constantly generated; immersing the base material in the dispersion that is in the reversible reaction condition to allow the carbon nanotubes to adhere to the surface of the base material; and drawing the base material adhered with the carbon nanotubes from the dispersion, followed by drying.

2 Claims, 16 Drawing Sheets

(30) Foreign Application Priority Data

May 8, 2013 (JP) ................................ 2013-098904
May 8, 2013 (JP) ................................ 2013-098905

(51) Int. Cl.
*C08J 5/04* (2006.01)
*B82Y 30/00* (2011.01)
*D06M 101/40* (2006.01)

(56) References Cited

U.S. PATENT DOCUMENTS

| | | | |
|---|---|---|---|
| 2007/0189953 | A1 | 8/2007 | Bai et al. |
| 2008/0241695 | A1 | 10/2008 | Song et al. |
| 2009/0305055 | A1 | 12/2009 | Shimizu |
| 2010/0143691 | A1 | 6/2010 | Katagiri |
| 2010/0178825 | A1 | 7/2010 | Shah |
| 2010/0206504 | A1 | 8/2010 | Akiyama |
| 2011/0039124 | A1 | 2/2011 | Ikeuchi et al. |
| 2011/0124253 | A1 | 5/2011 | Shah |
| 2011/0151254 | A1 | 6/2011 | Fugetsu et al. |
| 2012/0070667 | A1 | 3/2012 | Malet |

FOREIGN PATENT DOCUMENTS

| | | | | | |
|---|---|---|---|---|---|
| JP | 2007-523033 | A | | 8/2007 | |
| JP | 2009-016326 | A | | 1/2009 | |
| JP | 2009-295378 | A | | 12/2009 | |
| JP | 2010-059561 | A | | 3/2010 | |
| JP | 2013076198 | A | * | 4/2013 | |
| WO | WO-2009/119563 | A1 | | 10/2009 | |
| WO | WO-2012021724 | A2 | * | 2/2012 | ............... D02G 3/04 |

OTHER PUBLICATIONS

Li et al. Interfacial improvement of carbon fiber/epoxy composites using a simple process for depositing commercially functionalized carbon nanotubes on the fibers, Carbon, 52 (2013), pp. 109-121 (Year: 2013).

Yoshiki et al., JP 2003239171, "Carbon fiber, method for producing the same and carbon fiber-reinforced resin composition", Aug. 27, 2003.

Extended European Search Report issued in corresponding European Patent Application No. EP 14788527.1, dated Oct. 31, 2016.

Office Action issued in corresponding Chinese Patent Application No. CN 201480022146.4, dated Nov. 1, 2016.

J. Guo et al., "Effect of electrophoretically deposited carbon nanotubes on the interface of carbon fiber reinforced epoxy composite," J. Matter Sci 47, 2831-2836, (2012).

A. Laachachi et al., "A chemical method to graft carbon nanotubes onto a carbon fiber," Materials Letters 62, 394-397, (2008).

F. An et al., "Preparation of CNT-hybridized carbon fiber by aerosol-assisted chemical vapor deposition," J Mater Sci 47, 3327-3333, (2012).

Riichiro Saito et al., "Basic and Application of Carbon Nanotube" published by Baifukan Co., Ltd., Mar. 31, 2004, p. 2 and partial translation thereof.

International Search Report dated Jul. 22, 2014, issued for PCT/JP2014/061395.

Caio Enrico Pizzutto et al., Study of Epoxy/CNT Nanocomposites Prepared via Dispersion in the Hardener, Materials Research, 2011; 14(2), p. 256-263.

Notification of Reason for Refusal for the corresponding KR application No. 10-2015-7029963 dated Jan. 26, 2021 and English translation thereof.

* cited by examiner

1μm
50nm
10nm
3
9
5a
5b
7

METHOD FOR PRODUCING COMPOSITE MATERIAL

CROSS REFERENCE TO RELATED APPLICATIONS

This application is a continuation application of U.S. patent application Ser. No. 14/786,722 filed on Oct. 23, 2015, which is a national stage of International Application No.: PCT/JP2014/061395, which was filed on Apr. 23, 2014, and which claims priorities to JP 2013-098905 filed on May 8, 2013, JP2013-098904 filed on May 8, 2013, JP2013-091519 filed on Apr. 24, 2013 and JP 2013-091518 filed on Apr. 24, 2013, and which are all herein incorporated by reference.

TECHNICAL FIELD

The present invention relates to a composite material, in which carbon nanotubes (hereinafter abbreviated as "CNT") adhere to the surface of a base material, and a molded article comprising the composite material.

BACKGROUND ART

In such a composite material, in order for the composite material to exhibit the functions as a composite material, it is desired that CNTs uniformly adhere to the surface of a base material, so as to form a CNT network.

Such a composite material is produced by putting a base material in a solution in which CNTs are dispersed at a nano level (which is also abbreviated as a "CNT nano-dispersion" in the present description), allowing the CNTs to adhere to the surface of the base material while forming a network, then raising the base material from the CNT nano-dispersion, and then drying it.

However, since such CNTs irreversibly aggregate in the CNT nano-dispersion due to the van der Waals force, in order to allow the CNTs to uniformly adhere to the surface of the base material to form a CNT network, it is necessary to add a large amount of dispersant into the CNT nano-dispersion, so that aggregation of the CNTs is prevented and the CNTs are dispersed therein.

Moreover, upon this dispersion, ultrasonic irradiation or stirring is performed as an auxiliary treatment on the CNT nano-dispersion (see Patent Literature 1). A dispersant is required for dispersion of the CNTs, and in general, the dispersant has been used as an essential agent in the production process of the composite material.

Furthermore, in addition to the dispersant, an adhesive and other additives are also added to the CNT nano-dispersion, in order to allow the CNTs to adhere to the surface of the base material.

Since CNTs adhere to the base material in the thus produced composite material, it is expected that the composite material will exhibit the original functions of the base material, and will also exhibit improved electrical conductivity, heat conductivity, mechanical strength and the like, which are derived from the CNTs.

CITATION LIST

Patent Literature

Patent Literature 1: Japanese Patent Laid-Open No. 2010-59561

SUMMARY OF INVENTION

Technical Problem

In the above described composite material, in order to improve the performances as a composite material, such as electrical conductivity, heat conductivity and mechanical strength, CNTs have been allowed to adhere to the surface of a base material generally at a high concentration, and thereby a CNT network have been constructed at a high density on the surface of the base material.

However, when large quantities of CNTs are used, there is a fear that the original functions of the base material may be impaired. Meanwhile, although large quantities of CNTs have been adhered to the surface of the base material, the electrical conductivity, heat conductivity, mechanical strength and the like of the composite material have not yet arrived at a request level for practical use under the current circumstances.

It is an object of the present invention to provide a composite material capable of exhibiting the original functions of a base material thereof and also capable of exhibiting functions derived from CNTs, such as electrical conductivity, heat conductivity and mechanical strength, and a molded article therefrom.

Solution to Problem

In order to solve the current problem that in spite of incorporation of large quantities of CNTs into the composite material, the electrical conductivity, heat conductivity, mechanical strength and the like of the composite material have not yet arrived at a request level for practical use, the inventors have conducted studies considering that the cause of the aforementioned problem would be that a dispersant for dispersing CNTs, an adhesive for allowing the CNTs to adhere to the base material, and the likes are coated on the surface of such CNTs, but they are intermediary agents causing insulation or heat conduction failure. However, since the CNTs themselves have aggregation force, such a dispersant and an adhesive acting as intermediary agents are essential for uniformly dispersing the CNTs on the surface of the base material and allowing them to adhere thereto, and thus, there is no choice but to use them.

The present invention relates to a composite material, which maintains good dispersibility of CNTs even in a state in which there are no intermediary agents such as a dispersant and an adhesive essential for dispersion and adhesion of the CNTs, and which exhibits functions derived from CNTs, such as electrical conductivity, heat conductivity and mechanical strength, even in a low concentration of the CNTs, thereby satisfying a request level for practical use.

That is to say, a composite material according to the present invention comprises a base material and a structure formed on the surface of the base material, wherein the structure includes a plurality of carbon nanotubes that form a network structure, in which the carbon nanotubes are directly connected with one another and also directly adhere to the surface of the base material.

A molded article according to the present invention comprises a composite material of the present invention.

A composite material according to the present invention is a composite material in which a plurality of CNTs adhere to the surface of a base material, and the present composite material is characterized in that it is configured by dispersing the plurality of CNTs in a solution that does not contain intermediary agents such as a dispersant, then giving predetermined energy to the solution to create a reversible reaction state, in which a state in which the plurality of CNTs are dispersed in the solution and a state in which the plurality of CNTs aggregate in the solution reversibly take place, and then, when the plurality of CNTs transfer from the dispersion state to the aggregation state, by allowing the plurality of CNTs that intertwine with one another in a network form to directly come into contact with one another or to be directly connected with one another without intermediary agents, so that the CNTs directly adhere to the surface of the base material immersed in the solution in the reversible reaction condition without intermediary agents.

Advantageous Effects of Invention

According to the composite material of the present invention, a plurality of CNTs are allowed to directly come into contact with, or to be directly connected with surfaces of the CNTs without intermediary agents, so that the plurality of CNTs are dispersed and intertwine with one another on the surface of a base material, thereby forming a CNT network. Accordingly, even if small quantities of CNTs are used, the composite material can exhibit the performance derived from the CNTs, such as electrical conductivity and heat conductivity. Moreover, since the plurality of CNTs form a CNT network and directly adhere to the surface of the base material in a state in which there are no intermediary agents, the CNTs are hardly removed from the surface of the base material, and the mechanical strength of the composite material is thereby improved.

According to a molded article of the present invention, since the molded article comprises the composite material of the present invention, the mechanical strength thereof can be significantly improved, even if the base material of the molded article is, for example, a resin.

BRIEF DESCRIPTION OF DRAWINGS

FIG. 4A is a photograph of the CNTs according to the first embodiment, and FIG. 4B is a photograph of common CNTs;

FIG. 7A is an SEM photograph of the section of the composite material, FIG. 7B is an enlarged SEM photograph, FIG. 7C is a further enlarged SEM photograph, and FIG. 7D is a view schematically showing FIG. 7C.

FIG. 8A is a TEM photograph of the section of the composite material, and FIG. 8B is a TEM photograph obtained by the enlargement of the portion enclosed with the square frame in FIG. 8A, FIG. 8C is a TEM photograph obtained by further enlargement of the portion enclosed with the square frame in FIG. 8B, and FIG. 8D is a view schematically showing FIG. 8B;

FIG. 9A is a TEM photograph of the section of the composite material, and FIG. 9B is a TEM photograph obtained by the enlargement of the portion enclosed with the square frame in FIG. 9A, FIG. 9C is a TEM photograph obtained by further enlargement of a portion in FIG. 9B, and FIG. 9D is a view schematically showing FIG. 9B;

FIG. 10A is a TEM photograph of the section of the composite material, and FIG. 10B is a TEM photograph obtained by the enlargement of the portion enclosed with the square frame in FIG. 10A, FIG. 10C is a TEM photograph obtained by further enlargement of a portion in FIG. 10B, and FIG. 10D is a view schematically showing FIG. 10B;

DESCRIPTION OF EMBODIMENTS

Hereinafter, the embodiments of the present invention will be described in detail with reference to the drawings.

1. First Embodiment

(1) Configuration

Figure 1A:
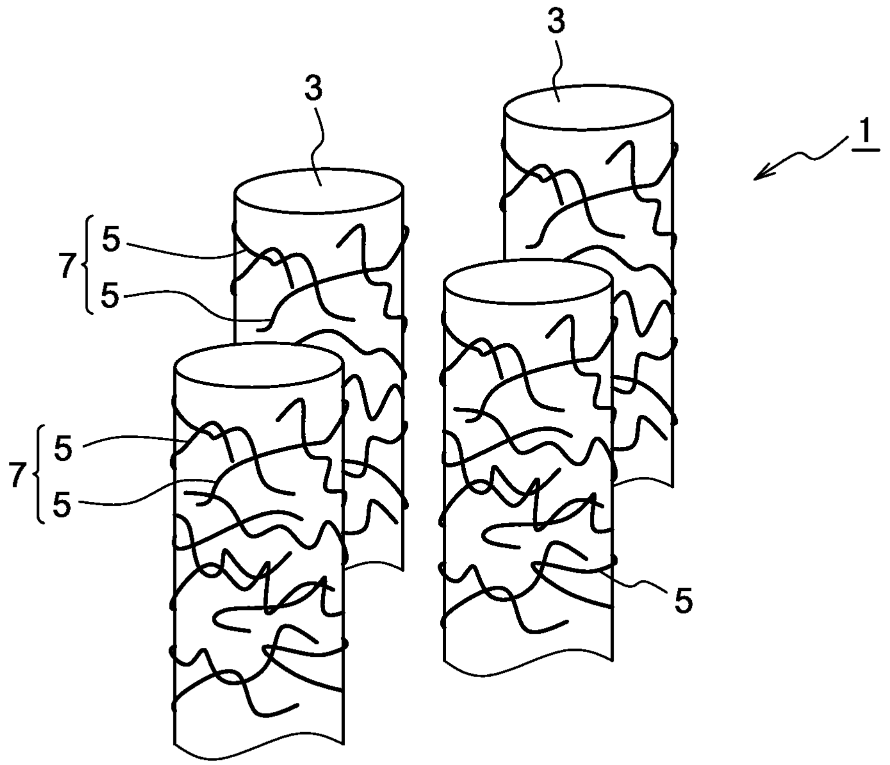
FIG. 1A is a conceptual configuration diagram of a composite material according to a first embodiment.

As shown in FIG. 1A, a composite material 1 comprises a plurality of base materials 3 and a structure 7 formed on the surface of each of the plurality of base materials 3.

The base material 3 is not particularly limited. Examples of the base material 3 include fibers formed from carbon materials, resin materials, metal materials, ceramic materials, and the like. In the case of the present embodiment, a carbon fiber is applied as a base material 3. It is to be noted that, in the present figure, a plurality of base materials 3 are shown for illustrative purposes. The base material 3 is not particularly limited, and an example of the base material 3 is a carbon fiber having a diameter of approximately 3 to 15 μm, which is obtained by calcination of organic fibers derived from petroleum, coal or coal tar, such as polyacrylonitrile, rayon or pitch, or organic fibers derived from timbers or plant fibers.

The structure 7 comprises a plurality of CNTs 5. The CNTs 5 are uniformly dispersed on almost the entire surface of the base material 3 and intertwine with one another, so that they are allowed to directly come into contact with or are directly connected with one another without intermediary agents and thereby form a network structure, and at the same time, the CNTs 5 directly adhere to the surface of the base material 3, in a state in which there are no intermediary agents at the boundary with the surface of the base material 3. The term "connect" is used herein to include a physical connection (simple contact). In addition, the term "adhere" is used herein to mean a bond due to the van der Waals force. Moreover, the expression "are allowed to directly come into contact with or are directly connected with" is used herein to include not only a state in which a plurality of CNTs are allowed to simply come into contact with one another without intermediary agents, but also a state in which the plurality of CNTs are connected with one another in an integrated manner. Thus, this expression should not be interpreted in such a limitation.

The structure 7 is locally unevenly distributed on the surface of the base material 3. Due to such an uneven distribution, the surface of the base material 3 is exposed from the structure 7. This "uneven distribution" merely indicates that the entire surface of the base material 3 is not uniformly coated with the structure 7, and this does not indicate the quality of the dispersibility of the CNTs 5 in the structure 7 itself.

The structure 7 can be referred to as a CNT network because the CNTs 5 are distributed on the surface of the base material 3 in a network form. Also, since the entire network constitutes a thin film, it is referred to as a CNT network, and thus, the name is not intended to limit the meanings.

Moreover, it may be adequate even if the CNTs 5 do not form a single network structure on the entire surface of the base material 3, or it may also be adequate even if a plurality of network structures that are independent from one another are present with respect to the single surface of the base material 3. Otherwise, it may also be adequate even if the structure 7 is not present on the entire single surface of the base material 3, or the structure 7 may be partially formed thereon.

Figure 1B:
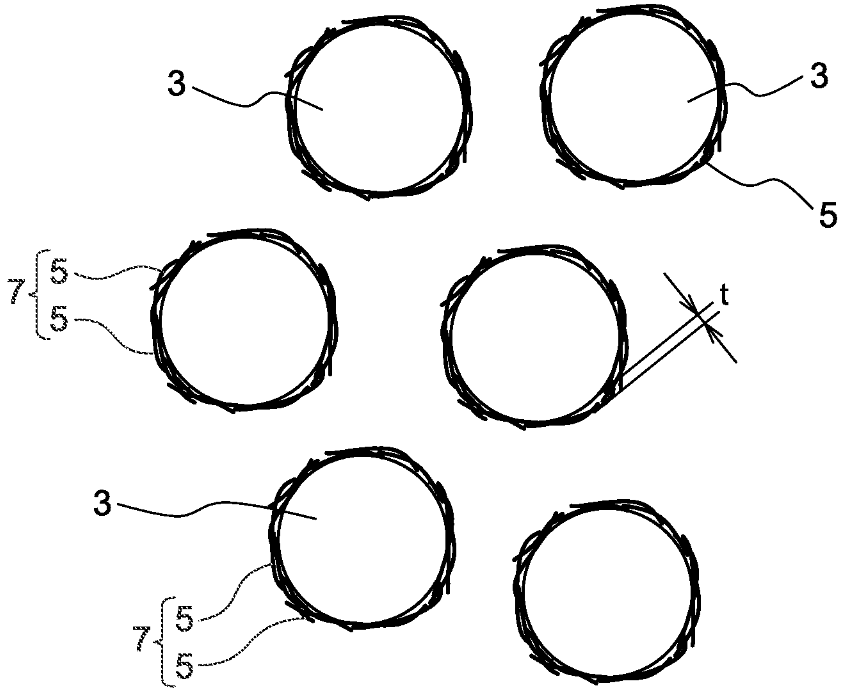
FIG. 1B is a view showing a thickness of a structure in the composite material of the embodiment.

As shown in FIG. 1B, the structure 7 forms a thin film, seeing from the section of the composite material 1, and the film thickness (t) is not limited. For example, the thickness of the thin film is preferably 500 nm or less. The structure 7 can exhibit its functions effectively, as long as the film thickness (t) is 500 nm or less from the surface of the base material 3. Naturally, the film thickness (t) of the structure 7 may also be more than 500 nm.

The film thickness (t) of the structure 7 from the surface of the base material 3 is measured as follows. Specifically, any material bundle is sampled from the CNT/carbon fiber composite material 1, and it is fixed on a metallic sample stand using a conductive tape or the like. From the sampled material bundle, a part of the base material 3 is debonded, and the structure 7 is exposed from the debonded site. Hence, the mean value (t) of the thickness of the section of the thus exposed structure 7 is measured by observing it under a scanning electron microscope (SEM).

Furthermore, the film thickness (t) of the structure 7 is more preferably 15 nm to 100 nm. If the thickness of the structure 7 is in the above described range, the CNTs 5 are dispersed on the surface of the base material 3, and they are directly connected with one another, so that a good network structure can be formed.

The length of the CNT 5 that forms the structure 7 is preferably 0.1 to 50 μm. If the length of the CNT 5 is 0.1 μm or more, the CNTs 5 intertwine with one another and are directly connected with one another. If the length of the CNT 5 is 50 μm or less, it becomes easy for the CNTs 5 to be uniformly dispersed. On the other hand, if the length of the CNT 5 is less than 0.1 μm, the CNTs 5 hardly intertwine with one another. If the length of the CNT 5 exceeds 50 μm, the CNTs 5 easily aggregate.

The CNT 5 preferably has a mean diameter of approximately 30 nm or less. If the diameter of the CNT 5 is 30 nm or less, it is highly flexible and becomes deformed along the curvature of the surface of the base material 3, so that a network structure can be formed. On the other hand, if the diameter of the CNT 5 exceeds 30 nm, flexibility is lost and it hardly becomes deformed along the surface of the base material 3, so that a network structure can be hardly formed. It is to be noted that the diameter of the CNT 5 is defined as a mean diameter measured using a transmission electron microscope (TEM) photograph. The CNT 5 more preferably has a mean diameter of approximately 20 nm or less.

The plurality of CNTs 5 preferably adhere to the surface of the base material 3 at a concentration of 0.001 to 20 wt % with respect to the base material 3. When the CNTs 5 are in the above described concentration range, a portion that is not coated with the CNTs 5 is formed on the surface of the base material 3. This portion that is not coated with the CNTs 5 is not coated with an adhesive or the like, and the surface of the base material 3 is exposed therefrom. Thereby, the functions of the base material 3 are not impaired by the CNTs 5. The concentration of the CNTs 5 is preferably 0.01 to 10 wt %, and more preferably 0.01 to 5 wt %, with respect to the base material 3.

Figure 2A:
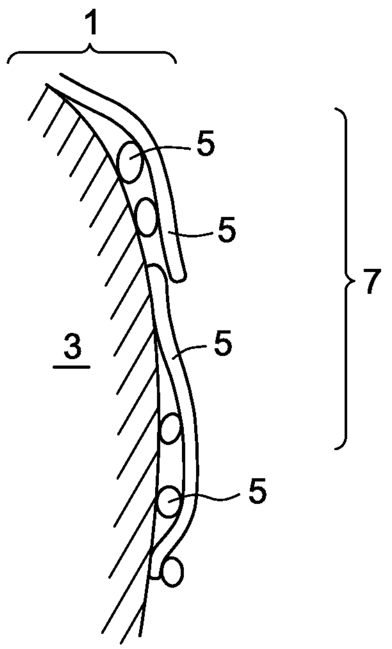
FIG. 2A is a conceptual configuration diagram of a composite material according to the first embodiment.

Moreover, as shown in FIG. 2A, the CNTs 5 directly adhere to the surface of the base material 3. That is to say, between the CNTs 5 and the surface of the base material 3, there are no intermediary agents including a dispersant such as a surfactant, and an adhesive, and the CNTs 5 directly adhere to the surface of the base material 3.

(2) Production Method

Figure 3:
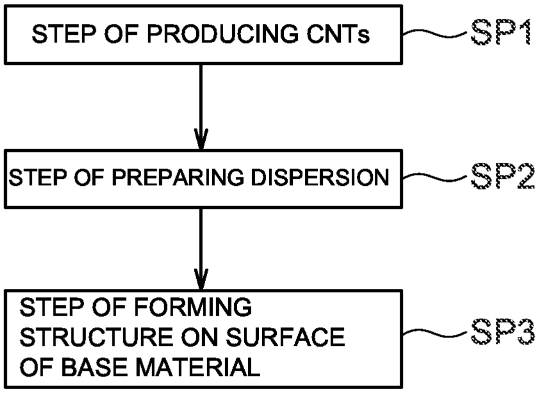
FIG. 3 is a production step view of the composite material of the first embodiment.

Next, a method for producing a composite material 1 will be described. As shown in FIG. 3, the composite material 1 can be produced by preparing CNTs 5 in step SP1, then preparing a dispersion containing the CNTs 5 in step SP2, and then forming a structure 7 on the surface of a base material 3 using the dispersion in step SP3. Hereafter, individual steps will be successively explained.

(Preparation of CNTs)

CNTs 5, which are produced by forming a catalytic film consisting of aluminum and iron on a silicon substrate according to the thermal CVD method as described, for example, in Japanese Patent Laid-Open No. 2007-126311, then processing the catalytic metal for the growth of the CNTs into fine particles, and then allowing hydrocarbon gas to come into contact with the catalytic metal in a heating atmosphere, are used. It is also possible to use CNTs produced by other production methods such as an arc discharge method or a laser evaporation method. However, it is preferable to use CNTs that contain a minimum amount of impurities other than the CNTs. Such impurities may be removed by high temperature annealing in inert gas after completion of the production of the CNTs. The CNTs produced in this production example are long CNTs that have a diameter of 30 nm or less and a length of several hundreds of μm to several mm and thus are linearly aligned at a high aspect ratio. The CNT may be either mono-walled or multi-walled. It is preferably a multi-walled CNT.

(Generation of Dispersion)

Thereafter, using the produced CNTs 5, a dispersion, in which the CNTs 5 are nano-dispersed, is produced. Nano-dispersion means a condition, in which CNTs 5 are physically separated into individual nanotubes and are dispersed in a solution in a state in which they do not intertwine with one another, and also in which the percentage of aggregates in which two or more CNTs 5 are aggregated in a bundle form is 10% or less.

The dispersion is formed by adding the above prepared CNTs 5 into a solvent, and then homogenizing the dispersion of the CNTs 5 using a homogenizer, shearing, an ultrasonic dispersant, etc. Examples of the solvent that can be used herein include water, alcohols such as ethanol, methanol or isopropyl alcohol, and organic solvents such as toluene, acetone, THF, MEK, hexane, normal hexane, ethyl ether, xylene, methyl acetate or ethyl acetate. The dispersion may contain a dispersant, a surfactant, an adhesive, an additive, etc., as long as it does not restrict the functions of the base material 3 and the CNTs 5.

(Formation of Structure)

In step SP3, in a state in which the base material 3 is immersed in the dispersion produced in the step SP2, mechanical energy such as shearing or ultrasonic wave is given to the dispersion, and the structure 7, namely, a network structure of the CNTs 5 is unevenly formed on the surface of the base material 3.

By giving mechanical energy to the dispersion, a reversible reaction condition, in which a state in which the CNTs 5 are dispersed in the dispersion and a state in which the CNTs 5 aggregate therein are constantly generated, is created.

The base material 3 is immersed in the dispersion that is in this reversible reaction condition. As a result, such a reversible reaction condition consisting of the dispersion state of the CNTs 5 and the aggregation state thereof takes place even on the surface of the base material 3, and when the CNTs 5 transfer from the dispersion state to the aggregation state, the CNTs 5 adhere to the surface of the base material 3.

Upon aggregation, the van der Waals force acts on the CNTs 5, and the CNTs 5 adhere to the surface of the base material 3 due to this van der Waals force. Thereafter, the base material 3 is drawn from the dispersion and is then dried, so as to obtain the composite material 1, in which network structures are unevenly distributed on the surface of the base material 3.

(3) Action and Effects

As shown in FIG. 2A, in the composite material 1 of the present embodiment, the CNTs 5 are allowed to directly come into contact with or are directly connected with one another, and at the same time, the CNTs 5 form the structure 7, and the structure 7 directly adheres to the surface of the base material 3. In the composite material 1 of the present embodiment, since the CNTs 5 are allowed to directly come into contact with or are directly connected with one another without intermediary agents, electrical conductivity and heat conductivity among the CNTs 5 in the structure 7 are both high, and at the same time, since the CNTs 5 form the structure 7 and the structure to the surface of the base material 3 in a state in which there are no intermediary agents, the CNTs are hardly removed from the surface of the base material 3, having high mechanical strength.

If the base material 3 is a carbon fiber, the carbon fiber itself has conductivity. However, the CNT 5 has higher conductivity than the carbon fiber does. Thus, by forming the structure 7 on the surface of carbon fibers without intermediary agents, the conductivity of the composite material 1 is significantly improved. Moreover, since the heat conductivity of the CNTs 5 is also extremely high, by forming the structure 7 on the surface of carbon fibers without intermediary agents, the heat conductivity of the composite material 1 is also significantly improved.

Moreover, in the composite material 1 of the present embodiment, by forming the structure 7 on the surface of carbon fibers without intermediary agents, mechanical strength is significantly improved in comparison with carbon fibers alone. This is similar to a structure in which reinforcing steel surrounds a steel frame in a network form, so that the strength of a reinforced concrete can be increased. In this case, the carbon fiber plays a role as a steel frame, and the CNT plays a role as a reinforcing steel, and the resin plays a role as a concrete, respectively.

Figure 2B:
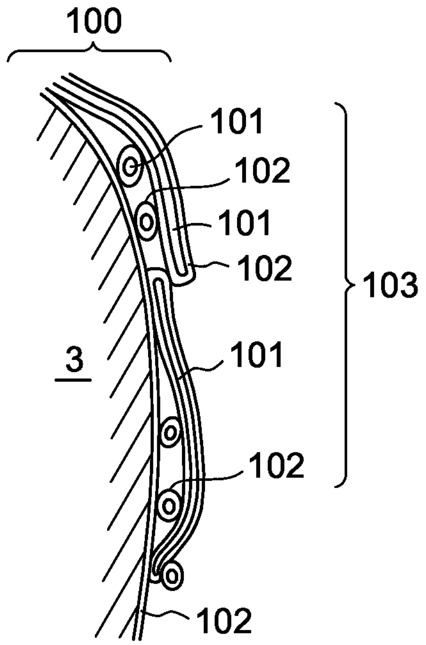
FIG. 2B is a conceptual configuration diagram of a conventional composite material.

In contrast, as shown in FIG. 2B, in a conventional composite material 100, an intermediary agent 102 is present on the surface of CNTs 101. Hence, the CNTs 101 are allowed to come into contact with or are connected with one another via the intermediary agent 102, and at the same time, the CNTs 101 form a structure 103, and this structure adheres to the surface of the base material 3 via the intermediary agent 102. Examples of the intermediary agent 102 include dispersants such as a surfactant, products having an insulation property such as adhesive, and products having insufficient heat conductivity. In the conventional composite material 100, since the CNTs 101 are allowed to come into contact with or are connected with one another via the intermediary agent 102, the electrical conductivity and heat conductivity between the structures 103 are insufficient. Moreover, since the CNTs 101 constitute a structure 7 and the structure adheres to the surface of the base material 3 via the intermediary agent 102, the CNTs 101 are easily removed from the surface of the base material 3, and the mechanical strength thereof is low.

(4) Examples

A composite material 1 was produced according to the procedures described in the above described production method. As CNT 5, MW-CNT (Multi-walled Carbon Nanotubes) that had been allowed to grow to a diameter of 10 to 15 nm and a length of 100 μm or more on a silicon substrate according to the thermal CVD method was used. In order to remove a catalytic residue from the CNT 5, a mixed acid of sulfuric acid and nitric acid (3:1) was used, and after completion of washing, it was filtrated and then dried. In order to cut the CNT 5, it was crushed with an ultrasonic homogenizer in a dispersion solvent, resulting in a length of 0.5 to 10 μm. Using methyl ethyl ketone as a dispersion solvent for the CNT, a dispersion was prepared. The concentration of the CNTs 5 in the dispersion was 0.01 wt %.

Figure 4A:
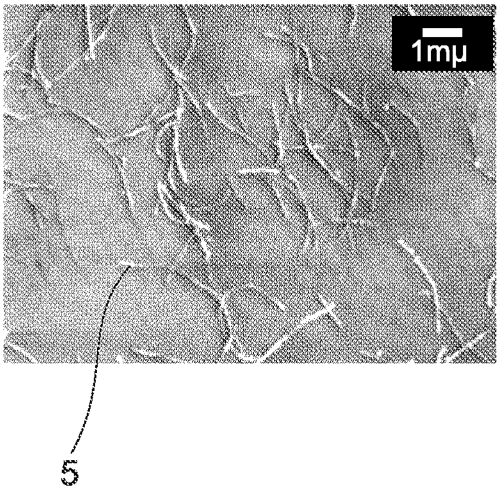
FIGS. 4A and 4B include SEM (scanning electron microscope) photographs of CNTs taken after a small amount of dispersion containing the CNTs has been added dropwise onto a silicon substrate and it has been then dried in an oven at 400° C. for 1 hour.
Figure 4B:
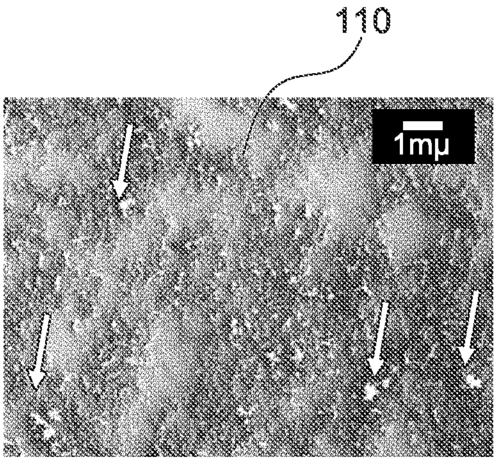
Figure 5A:
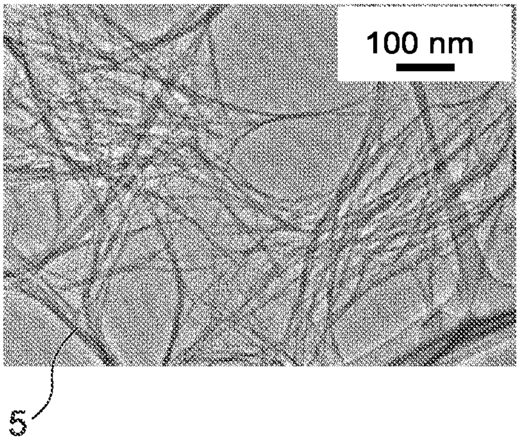
FIG. 5A is a TEM (transmission electron microscope) photograph of CNTs in a dispersion containing the CNTs according to the first embodiment.
Figure 5B:
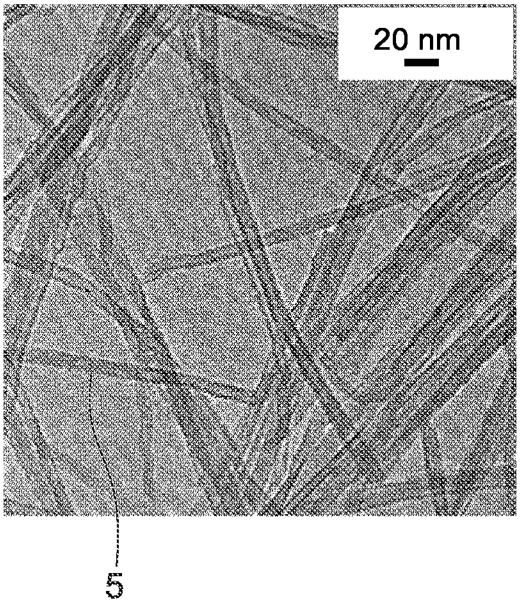
FIG. 5B is an enlarged photograph of FIG. 5A.

The prepared dispersion was observed under SEM and TEM. An SEM photograph of the CNTs 5, which was obtained by adding a small amount of the dispersion produced in the above described steps dropwise to a silicon substrate and then drying it in an oven at 400° C. for 1 hour, is shown in FIG. 4A. FIG. 4B is an SEM photograph of the CNTs 110 obtained by subjecting a dispersion containing common CNTs to the same treatments as those described above. As is apparent from FIG. 4A, it is found that the CNTs 5 are like individual nano-dispersed fibers with a high aspect ratio. In contrast, as is apparent from FIG. 4B, it is found that the CNTs 110 are inappropriate to be used in formation of a network structure because the aspect ratio thereof is low. Moreover, in FIG. 4B, the portion indicated with the arrow indicates a state in which the CNTs 110 are not isolated from one another but aggregate. FIG. 5A and FIG. 5B each show a TEM photograph of the CNTs 5 in the dispersion produced in the above described steps. As shown in FIG. 5A and FIG. 5B, all of the CNTs 5 have a tubular shape, and their diameters are almost 20 nm or less, and thus, it is found that the CNTs 5 have a shape suitable for formation of a uniform CNT network. To this dispersion, neither a dispersant nor an adhesive has been added.

Subsequently, while ultrasonic waves of 28 kHz and 40 kHz were given to the dispersion, carbon fibers (PAN carbon fibers, fiber diameter: 7 μm) were put as a base material 3 in the dispersion, and the dispersion was then retained for 10 seconds. Thereafter, the base material 3 was taken from the dispersion, and was then dried on a hot plate at approximately 80° C., so as to form a structure 7 on the surface of the base material 3. Thus, the composite material 1 was obtained.

Figures 6A, 6B, 6C, 6D:
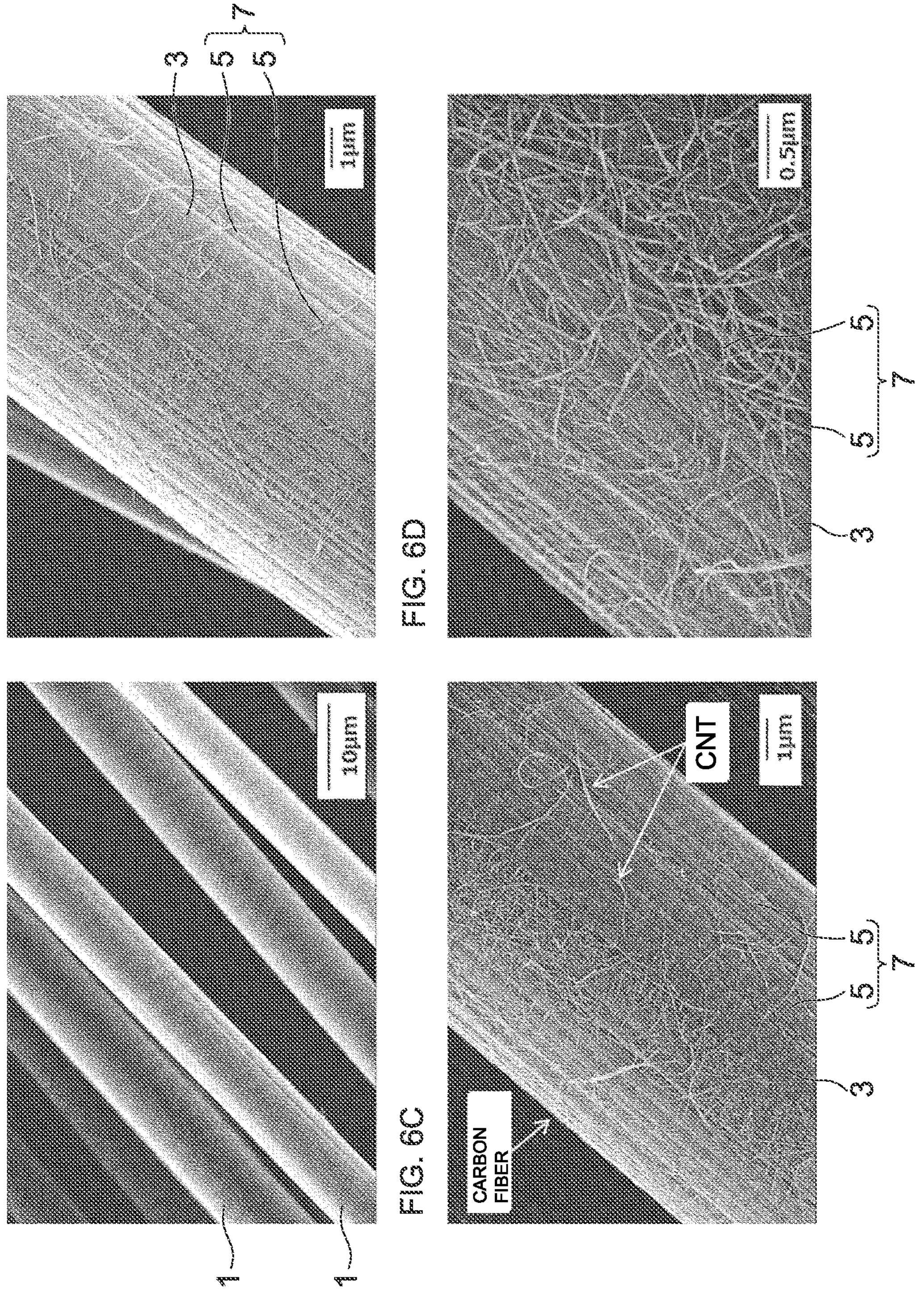
FIG. 6A is an SEM photograph of the appearance of the composite material of the first embodiment.
FIG. 6B is an enlarged photograph of FIG. 6A.
FIG. 6C is an enlarged photograph of another portion of FIG. 6A.
FIG. 6D is a further enlarged photograph of FIG. 6C.

FIG. 6A to FIG. 6D each show an SEM photograph of the composite material 1 of the first embodiment. FIG. 6A shows a plurality of composite materials 1, and FIG. 6B to FIG. 6D show successive enlargements of the photograph of FIG. 6A. With regard to the composite material 1, a state in which a plurality of CNTs 5 are uniformly dispersed on the surface of the base material 3 to form a structure 7 without intermediary agents is shown. Since the concentration of the CNTs 5 with respect to the base material 3 is low in this composite material 1, the surface of the base material 3 is directly exposed from the structure 7 without intermediary agents. It is apparent that the composite material 1 shown in FIG. 6A to 6D has the properties that have been explained with reference to FIG. 2A.

Figure 7A:
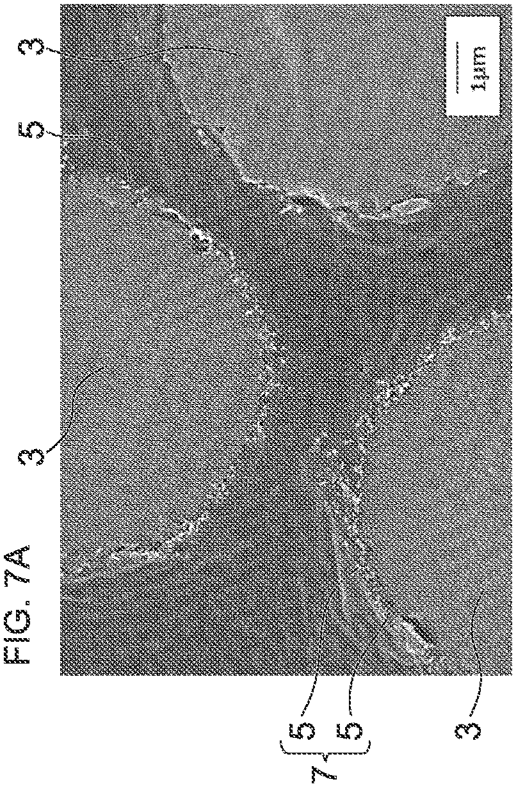
FIGS. 7A-7D are SEM photographs showing successive enlargements of the section of the composite material of the first embodiment.
Figure 7B:
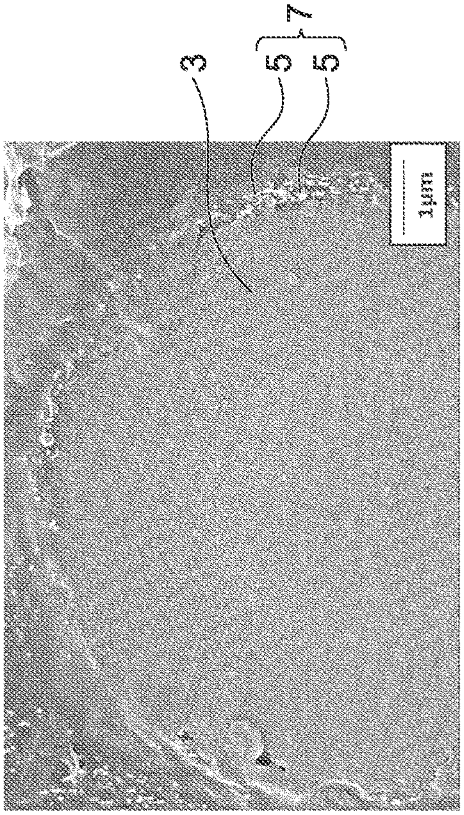
Figure 7C:
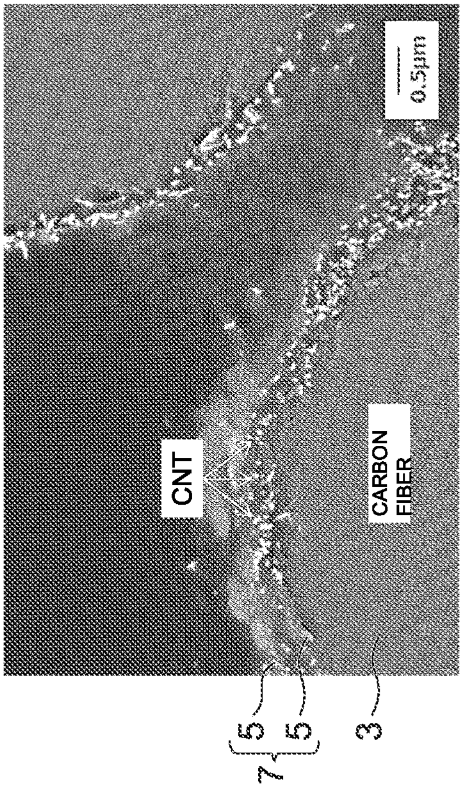
Figure 7D:
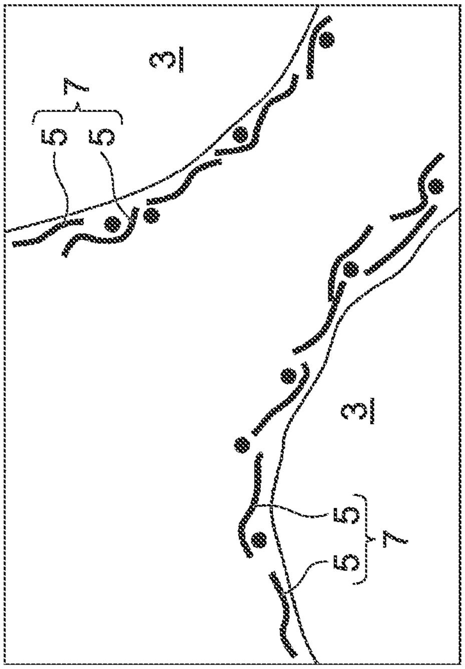

FIG. 7A to FIG. 7C are SEM photographs showing successive enlargements of the section of the composite material of the first embodiment, and FIG. 7D is a view schematically showing FIG. 7C.

Figures 8A, 8B, 8C, 8D:
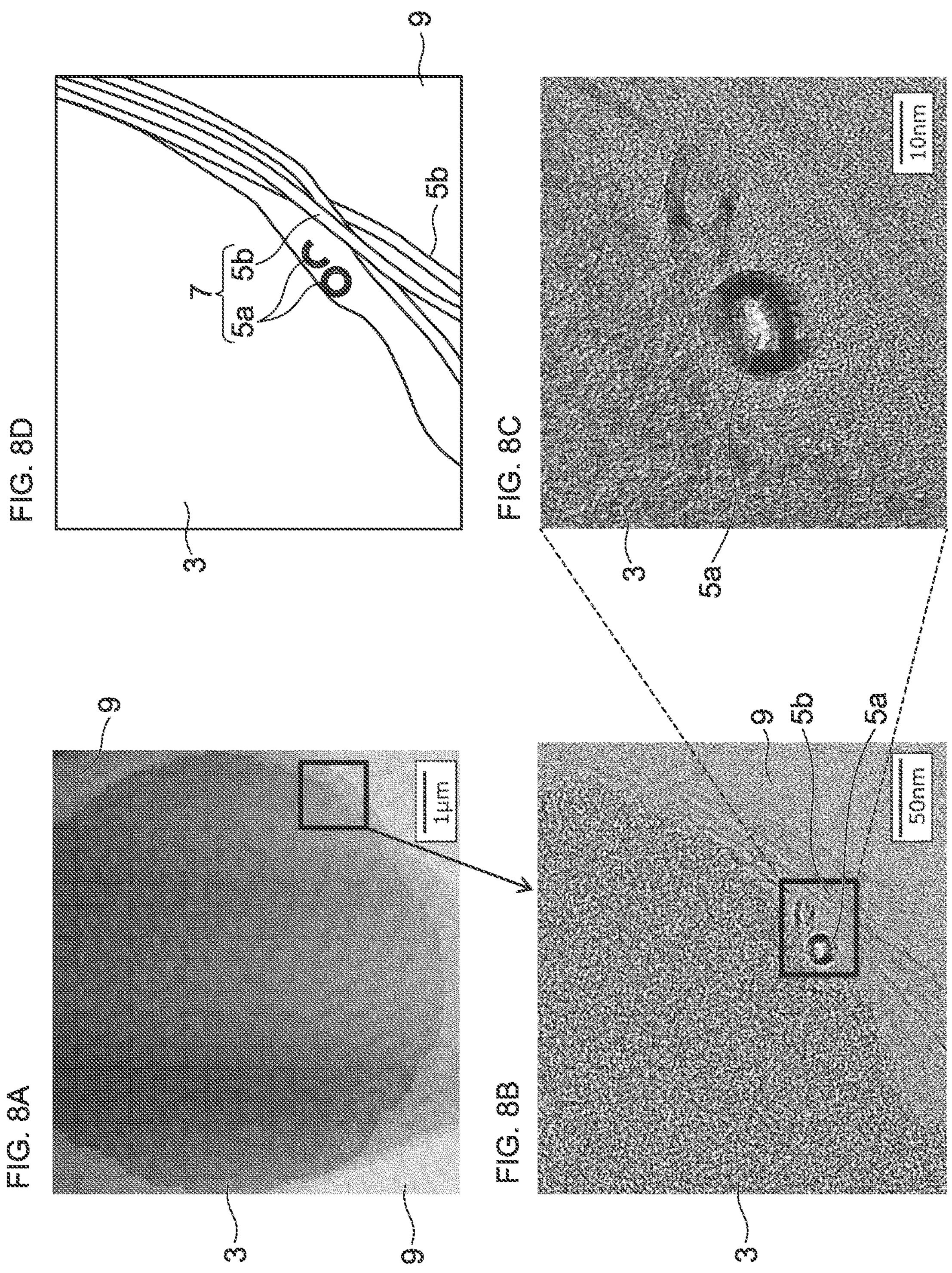
FIGS. 8A-8D are TEM photographs showing successive enlargements of the section of the composite material of the first embodiment.

FIG. 8A to FIG. 8C are TEM photographs showing successive enlargements of the section of the composite material of the first embodiment. In these figures, the numbers 5*a* and 5*b* indicate CNTs, and the number 9 indicates an epoxy resin. In FIG. 8A to FIG. 8C, CNTs 5*a* directly adhere to the surface of the base material 3 without intermediary agents, and the section thereof is shown. The other CNTs 5*b* form a network structure and are allowed to directly come into contact with or are directly connected with one another, and also the CNTs 5*b* directly adhere to the surface of the base material 3 without intermediary agents, and the section thereof is shown.

Figure 9A:
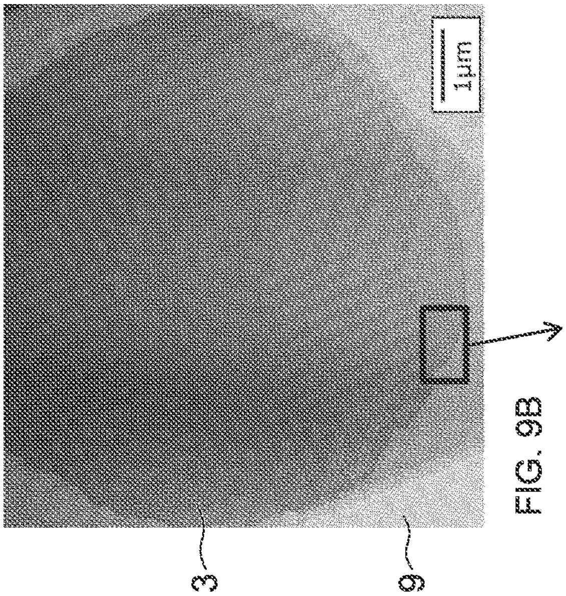
FIGS. 9A-9D are TEM photographs showing successive enlargements of the section of the composite material of the first embodiment.
Figure 9B:
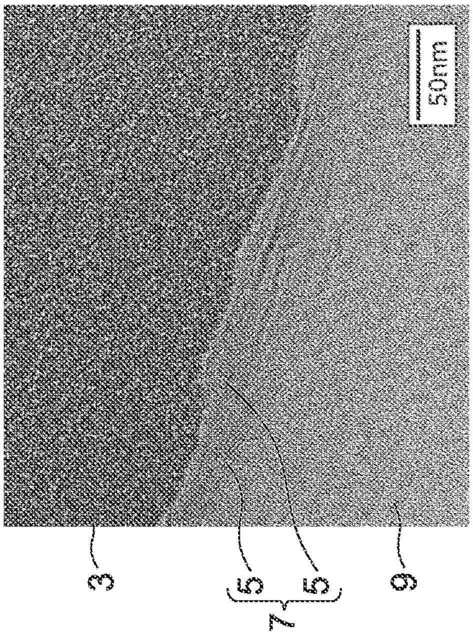
Figure 9C:
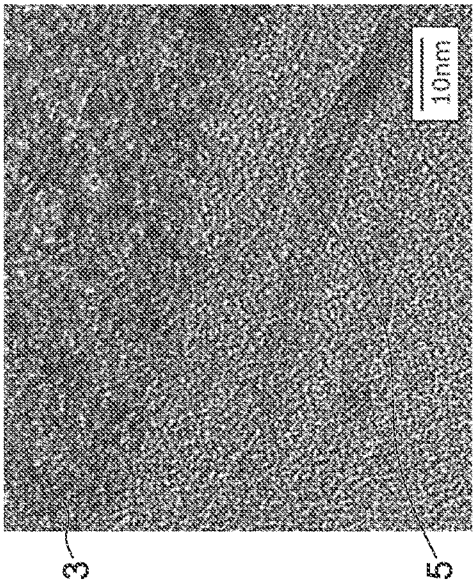
Figure 9D:
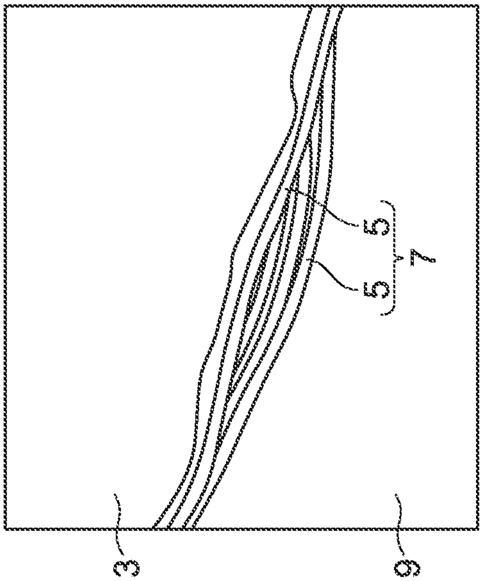

FIG. 9A to FIG. 9C are TEM photographs showing successive enlargements of another portion of the section of the composite material of the first embodiment. In FIG. 9A to FIG. 9C, CNTs 5 form a network structure and are allowed to directly come into contact with or are directly connected with one another without intermediary agents, and also the CNTs 5 directly adhere to the surface of the base material 3 without intermediary agents, and the section thereof is shown.

Figure 10A:
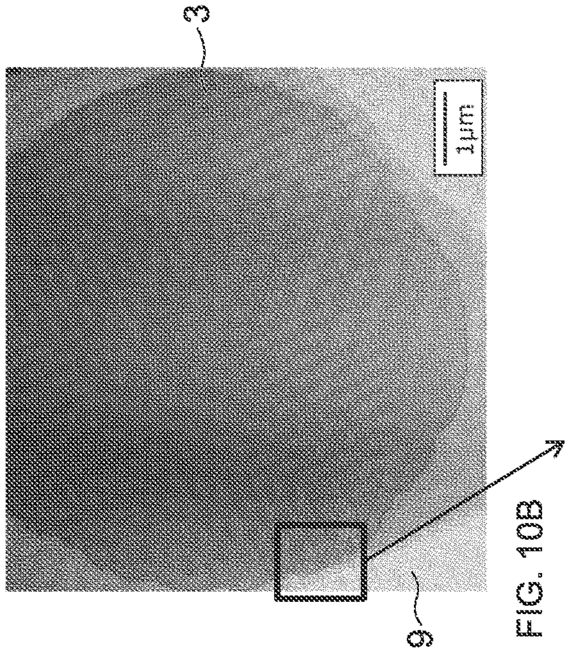
FIGS. 10A-10D are TEM photographs showing successive enlargements of the section of the composite material of the first embodiment.
Figure 10B:
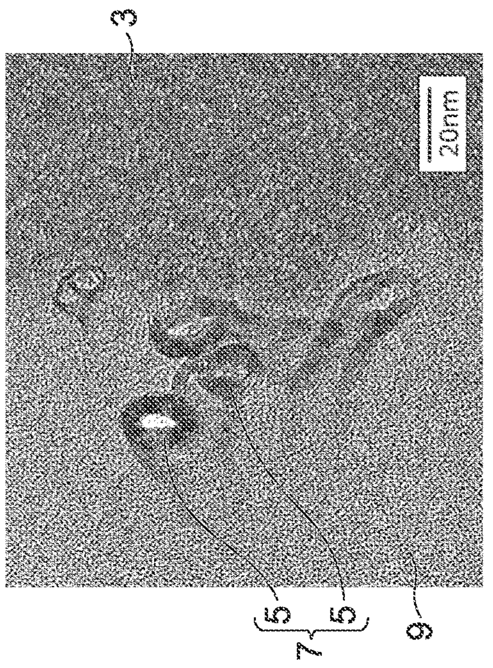
Figure 10C:
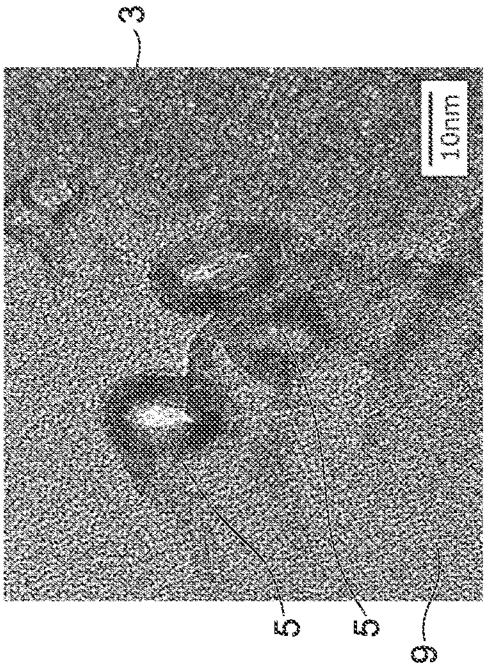
Figure 10D:
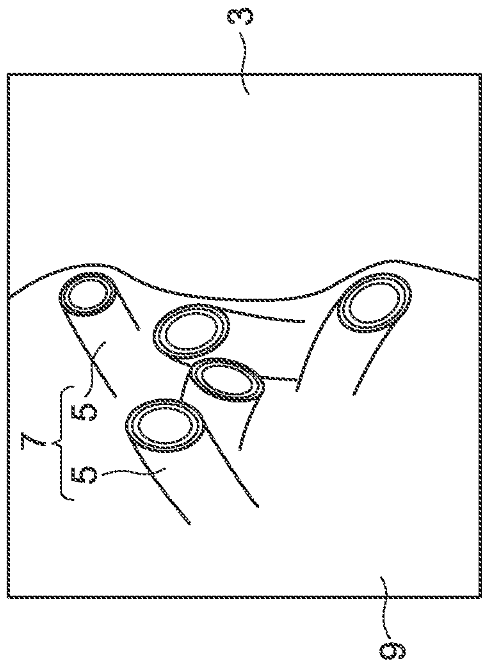

FIG. 10A to FIG. 10C are other TEM photographs showing successive enlargements of a further portion of the section of the composite material of the first embodiment. In FIG. 10A to FIG. 10C, CNTs 5 form a network with one another without intermediary agents and are allowed to directly come into contact with or are directly connected with one another, and also the CNTs 5 directly adhere to the surface of the base material 3 without intermediary agents, and the section thereof is shown.

As shown in the SEM photographs, TEM photographs and schematic views of FIG. 6A to FIG. 10D, in the composite material 1 of the first embodiment, a plurality of CNTs 5 (5*a* and 5*b*) are uniformly dispersed on the surface of the base material 3, so as to configure a structure 7. No intermediary agents are observed in the periphery of each CNT 5, and the CNTs 5 are allowed to directly come into contact with or are directly connected with one another, and directly adhere to the surface of the base material 3, so as to configure the structure 7. In addition, a state in which each CNT 5 directly adheres to the surface of the base material 3 without intermediary agents is shown. In this composite material 1, since the concentration of the CNTs 5 with respect to the base material 3 is low, the surface of the base material 3 is directly exposed from the structure 7 without intermediary agents. The composite material 1 shown in each of FIG. 6A to FIG. 10D apparently has the properties explained with reference to FIG. 2A.

Figure 11B:
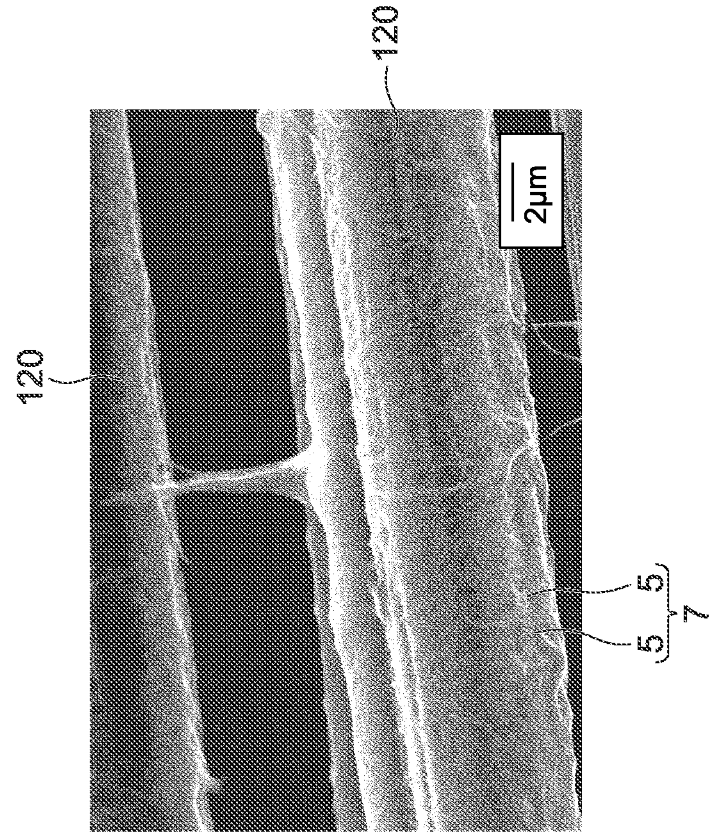
FIG. 11B is an enlarged SEM photograph of FIG. 11A.
Figure 11A:
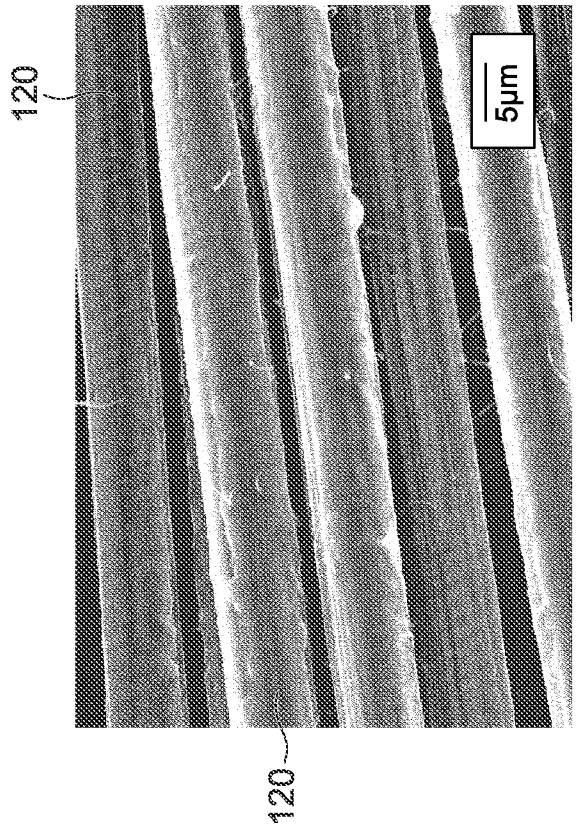
FIG. 11A is an SEM photograph of a conventional composite material.

In contrast, as shown in FIG. 11A and FIG. 11B, a conventional composite material 120 produced using a dispersant as an intermediary agent is produced by putting carbon fibers used as a base material in a dispersion of CNTs 5, into which a dispersant and an adhesive have been added, and the surface of the carbon fibers is coated with a structure 7, the dispersant and the adhesive, and is thus hardly exposed. The plurality of CNTs 5 are complicatedly dispersed in the dispersion to form the structure 7. Since the surface of the CNTs 5 is coated with the dispersant or the adhesive, the CNTs 5 adhere to the surface of the carbon fibers mediated by the dispersant or the adhesive. Accordingly, the conventional composite material 120 shown in FIG. 11A and FIG. 11B apparently does not comprise the properties explained with reference to FIG. 2A.

Figure 12:
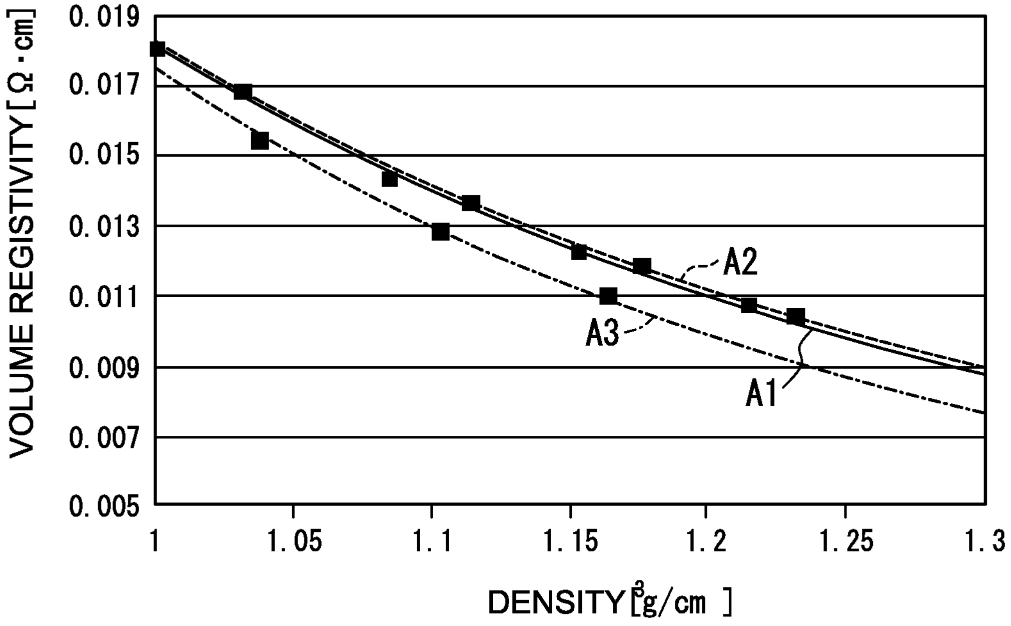
FIG. 12 is a view showing the conductive properties of a composite material consisting only of carbon fibers, a conventional composite material, and the composite material of the first embodiment.

FIG. 12 is a view showing the properties of conductivity of each of a material consisting only of carbon fibers, the conventional composite material 120, and the composite material 1 of the first embodiment. In the conventional composite material 120, CNTs 5 adhere to the surface of carbon fibers via a surfactant that is a dispersant. In the composite material 1 of the first embodiment, CNTs 5 directly adhere to the surface of carbon fibers without using a surfactant as an intermediary agent. In FIG. 12, the horizontal axis indicates the density of carbon fibers ($g/cm^3$), and the longitudinal axis indicates volume resistivity (Ω·cm). The volume resistivity (Ω·cm) was measured using Powder Resistivity Measurement System (manufactured by Mitsubishi Chemical Analytech Co., Ltd., product name: MCP-PD51).

Herein, characteristic line A1 indicates the properties of the material consisting only of carbon fibers, and characteristic line A2 indicates the properties of the conventional composite material 120. This conventional composite material 120 contains CNTs 5 at a concentration of 0.1 wt % with respect to the carbon fibers, and at the same time, a surfactant is present as an intermediary agent in the conventional composite material 120.

Characteristic line A3 indicates the properties of the composite material 1 of the first embodiment. This composite material 1 of the first embodiment contains CNTs 5 at a concentration of 0.05 wt % with respect to the carbon fibers used as a base material 3, and at the same time, a surfactant is not present as an intermediary agent in the composite material 1 of the first embodiment.

As is apparent from the comparison made among these characteristic lines A1 to A3, in the case of a density of 1.2 ($g/cm^3$), the volume resistivity of the material consisting only of carbon fibers indicated as characteristic line A1 is 0.0110 (Ω·cm), the volume resistivity of the conventional composite material 120 indicated as characteristic line A2 is 0.0111 (Ω·cm), and the volume resistivity of the composite material 1 of the first embodiment indicated as characteristic line A3 is 0.0098 (Ω·cm). From these results, it is found that the composite material 1 of the first embodiment has the best conductivity.

That is to say, in the case of the characteristic line A1, the obtained conductivity is the conductivity of the carbon fibers themselves, the ratio in which the carbon fibers are allowed to directly come into contact with one another is low, and the conductivity is totally low. In the case of the characteristic line A2, even if the contact or connection is mediated by the structure 7, since a surfactant is present as an intermediary agent on the surface of CNTs constituting the structure 7, such an intermediary agent becomes resistance upon the contact or connection among the CNTs in the structure 7 or the contact or connection of the structure 7 with the surface of carbon fibers. As such, the conductivity of the characteristic line A2 is rather slightly lower than the conductivity of the characteristic line A1, and thus, it has not arrived at a required level for practical use.

In comparison with these characteristic lines A1 and A2, in the case of the characteristic line A3 of the composite material 1 of the first embodiment, CNTs 5 are allowed to directly come into contact with or are directly connected with one another without using a surfactant that is an intermediary agent, and further, the CNTs 5 are almost uniformly dispersed and intertwine to directly come into contact or to be directly connected on the surface of carbon fibers without surfactants serving as intermediary agents. Thus, the conductivity thereof has been improved by 10% or more.

It has been confirmed from the experiment conducted by the inventors that a conventional composite material, which comprises CNTs at a concentration of over 10 wt % with respect to carbon fibers and in which a surfactant is present as an intermediary agent, has conductivity poorer than that of the composite material 1 of the first embodiment.

Figure 13:
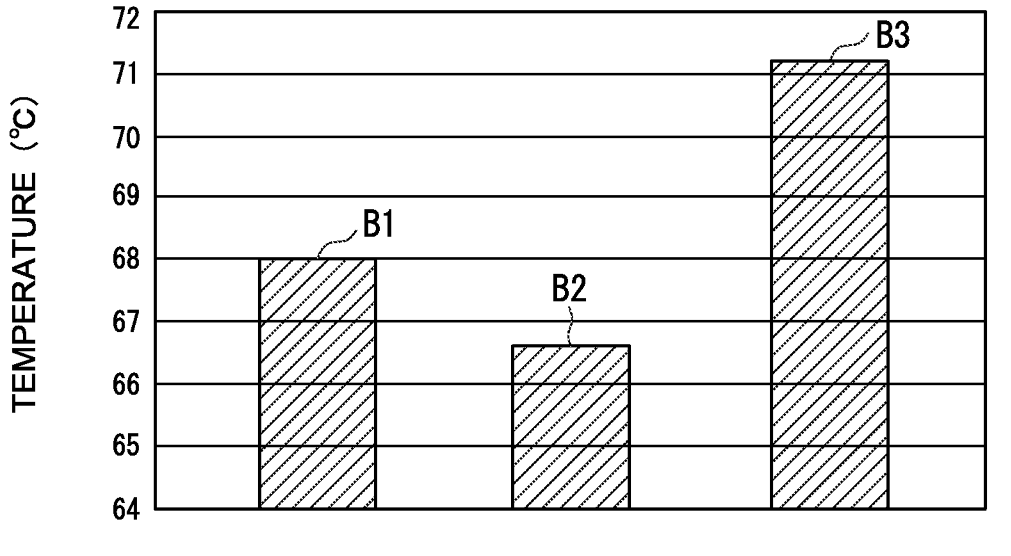
FIG. 13 is a view showing the heat conductive properties of a composite material consisting only of carbon fibers, a conventional composite material, and the composite material of the first embodiment.

FIG. 13 is a view showing the properties of heat conductivity of each of a material consisting only of carbon fibers, the conventional composite material 120, and the composite material 1 of the first embodiment. The conventional composite material 120 has CNTs adhered to the surface of carbon fibers via a surfactant that is an intermediary agent. The composite material 1 of the first embodiment has CNTs directly adhered to the surface of carbon fibers without using a surfactant as an intermediary agent. In FIG. 13, B1 indicates the heat conductive properties of the material consisting only of carbon fibers, B2 indicates the heat conductive properties of the conventional composite material 120, and B3 indicates the heat conductive properties of the composite material 1 of the first embodiment. The longitudinal axis indicates temperature (° C.).

Subsequently, heat conductive properties were measured according to the following procedures. First, the material consisting only of carbon fibers, the conventional composite material 120, and the composite material 1 of the first embodiment were each fixed with an epoxy resin, so that samples each having a length of 1.5 cm and a diameter of 1.7 mm were prepared. The heat conductive properties of each sample were measured individually. The samples were each connected with a contact thermometer (manufactured by Anritsu Meter Co., Ltd., product name: HA-100), and thereafter, the samples were each placed on a hot plate with a size of 180×180 mm in height and width that consisted of a ceramic material (manufactured by TGK Station, product name: Hotplate Chimarec HP131224). The temperature of this hot plate was set at 85(° C.), and the individual samples were heated from a single ordinary temperature by the fever of the hot plate for 2 minutes. The temperature of each sample was increased by the transfer of the fever of the hot plate. The increased temperature was measured using the contact thermometer.

As a result of the measurement, the temperature of the material consisting only of carbon fibers was measured to be approximately 68(° C.) as shown in B1, and the temperature of the conventional composite material 120 was measured to be approximately 66.6(° C.) as shown in B2. As shown in B3, the temperature of the composite material 1 of the first embodiment was measured to be approximately 71.2(° C.). Thereby, the composite material 1 of the first embodiment had excellent results, in that it had heat conductive properties that were higher than those of the material consisting only of carbon fibers by approximately 4.7%, and also, it had heat conductive properties that were higher than those of the conventional composite material 120 by approximately 6.9%.

As described above, in the composite material of the first embodiment, since a plurality of CNTs are allowed to directly come into contact with or are directly connected with one another's CNT surfaces without intermediary agents, and they are dispersed and intertwine with one another on the surface of the base material so as to configure a CNT network, even if small quantities of CNTs are used, the composite material of the first embodiment can exhibit electrical conductivity and heat conductivity, which are higher than those of the conventional composite material. Moreover, since the plurality of CNTs form a CNT network and directly adhere even to the surface of the base material in a state in which there are no intermediary agents, the CNTs are hardly removed from the surface of the base material, and it can be said that the composite material of the first embodiment is a composite material with improved mechanical strength, in comparison to the conventional composite material.

Moreover, in the composite material of the first embodiment, CNTs adhere to carbon fibers used as a base material at a low concentration of 0.001 to 20 wt %, preferably 0.01 to 10 wt %, and more preferably 0.01 to 5 wt %. That is to say, it can be said that the composite material of the first embodiment is a composite material that can exhibit performance, namely, conductivity and heat conductivity, which are higher than those of the conventional composite material, although the amount of CNTs is small.

Explanation regarding the measurement of the mechanical strength of the composite material of the first embodiment will be omitted. According to the experiment conducted by the inventors, the mechanical strength of the composite material of the first embodiment has been improved in comparison to that of the conventional composite material.

2. Second Embodiment

(1) Configuration

Figure 14:
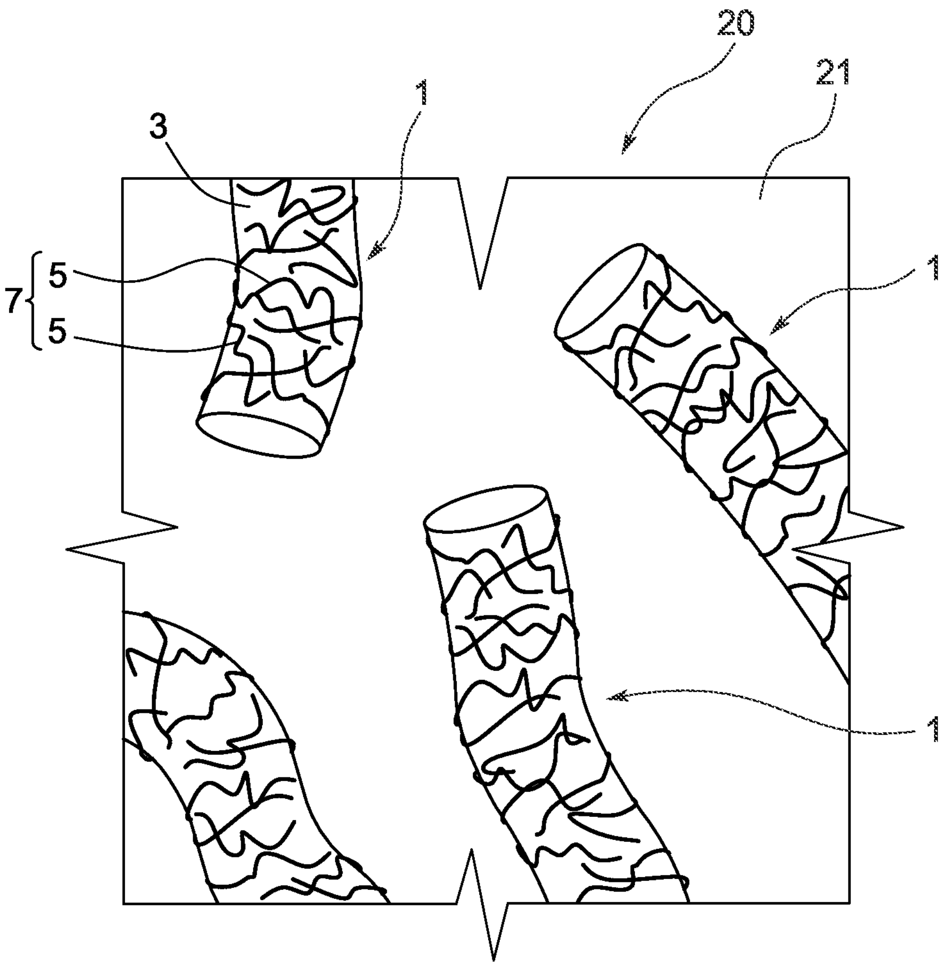
FIG. 14 is a conceptual configuration diagram of the molded article of a second embodiment.

Next, the molded article according to the second embodiment will be described. The composite material of the first embodiment is used in the molded article. FIG. 14 is a conceptual configuration diagram of a molded article 20, in which the composite material 1 of the first embodiment is used.

The molded article 20 comprises a matrix material 21 and a composite material 1 dispersed in the matrix material 21. As such a matrix material 21, a resin, for example, an epoxy resin, can be used.

The matrix material 21 is not limited to the epoxy resin, and examples of the matrix material 21 include thermosetting resins such as a phenolic resin, a melamine resin, a urea resin, an unsaturated polyester resin, an alkyd resin and thermosetting polyimide, thermoplastic resins such as polyethylene, polypropylene, polystyrene, an acrylonitrile/styrene resin, an acrylonitrile/butadiene/styrene resin, a methacrylic resin and vinyl chloride, engineering plastics such as polyamide, polyacetal, polyethylene terephthalate, ultrahigh molecular weight polyethylene and polycarbonate, and super engineering plastics such as polyphenylene sulfide, polyether ether ketone, a liquid crystal polymer, polytetrafluoroethylene, polyether imide, polyarylate and polyimide.

Moreover, the matrix material 21 may comprise inorganic materials including metals such as aluminum, copper, titanium or silicon, or the oxides thereof, as well as a resin.

In the case of the present embodiment, in order to uniformly disperse the composite material 1 in the matrix material 21, a dispersant, an adhesive, and other additives may be used.

Examples of the dispersant serving as an intermediary agent include an amphoteric surfactant, an anionic surfactant, a cationic surfactant, and a nonionic surfactant.

Examples of the amphoteric surfactant include sulfobetaines, phosphobetaines, carboxybetaines, imidazolium betaines, and alkylamine oxides.

Examples of the anionic surfactant include alkylbenzene sulfonate (e.g., C6-24 alkylbenzene sulfonate such as sodium laurylbenzenesulfonate, etc.), alkylnaphthalene sulfonate (e.g., di-C3-8 alkylnaphthalene sulfonate such as sodium diisopropylnaphthalenesulfonate, etc.), alkyl sulfonate (e.g., C6-24 alkyl sulfonate such as sodium dodecanesulfonate, etc.), dialkylsulfosuccinic acid ester salt (e.g., di-C6-24 alkyl sulfosuccinate such as sodium di-2-ethylhexylsulfosuccinate, etc.), alkyl sulfate (e.g., sulfated grease, C6-24 alkyl sulfate such as a sodium salt of coconut oil-reduced alcohol and sulfuric acid ester, polyoxyethylene alkyl ether sulfate to which polyoxyethylene is added at the average number of moles of 2 to 3, etc.), and alkyl phosphate (e.g., mono- to tri-C8-18 alkyl ester phosphate such as mono- to tri-lauryl ether phosphate, polyoxyethylene alkyl ether phosphate, etc.).

Examples of the cationic surfactant include tetraalkylammonium salt (e.g., mono- or di-C8-24 alkyl-tri- or dimethylammonium salts such as lauryltrimethylammonium chloride or dioctadecyldimethylammonium chloride, etc.), trialkylbenzylammonium salt [e.g., C8-24 alkylbenzyldimethylammonium salt such as cetylbenzyldimethylammonium chloride (benzalkonium chloride salt, etc.), etc.], and alkylpyridinium salt (e.g., C8-24 alkylpyridinium salt such as cetylpyridinium bromide, etc.).

Examples of the nonionic surfactant include polyoxyethylene alkyl ether (e.g., polyoxyethylene C6-24 alkyl ether such as polyoxyethylene octyl ether, polyoxyethylene lauryl ether or polyoxyethylene cetyl ether), polyoxyethylene alkylphenyl ether (e.g., polyoxyethylene C6-18 alkylphenyl ether such as polyoxyethylene octylphenyl ether or polyoxyethylene nonylphenyl ether, etc.), polyoxyethylene polyhydric alcohol fatty acid partial ester (e.g., polyoxyethylene glycerin C8-24 fatty acid ester such as polyoxyethylene glycerin stearic acid ester, polyoxyethylene sorbitan C8-24 fatty acid ester such as polyoxyethylene sorbitan stearic acid ester, polyoxyethylene sucrose C8-24 fatty acid ester, etc.), and polyglycerin fatty acid ester (e.g., polyglycerin C8-24 fatty acid ester such as polyglycerin monostearic acid ester).

Moreover, examples of the adhesive serving as an intermediary agent include adhesive resins such as a polyolefin resin, an acrylic resin, a vinyl acetate resin, a polyester resin, a polyamide resin, and a polyurethane resin.

Furthermore, examples of the additive include surface treatment agents (coupling agents such as a silane coupling agent, etc.), coloring agents (dyes and pigments, etc.), hue improving agents, dye fixing agents, glossing agents, metal corrosion preventing agents, stabilizers (an antioxidant, an ultraviolet absorber, etc.), dispersion stabilizing agents, thickeners or viscosity adjusting agents, thixotropic property-imparting agents, leveling agents, defoaming agents, disinfectants, and fillers.

(2) Production Method

Figure 15A:
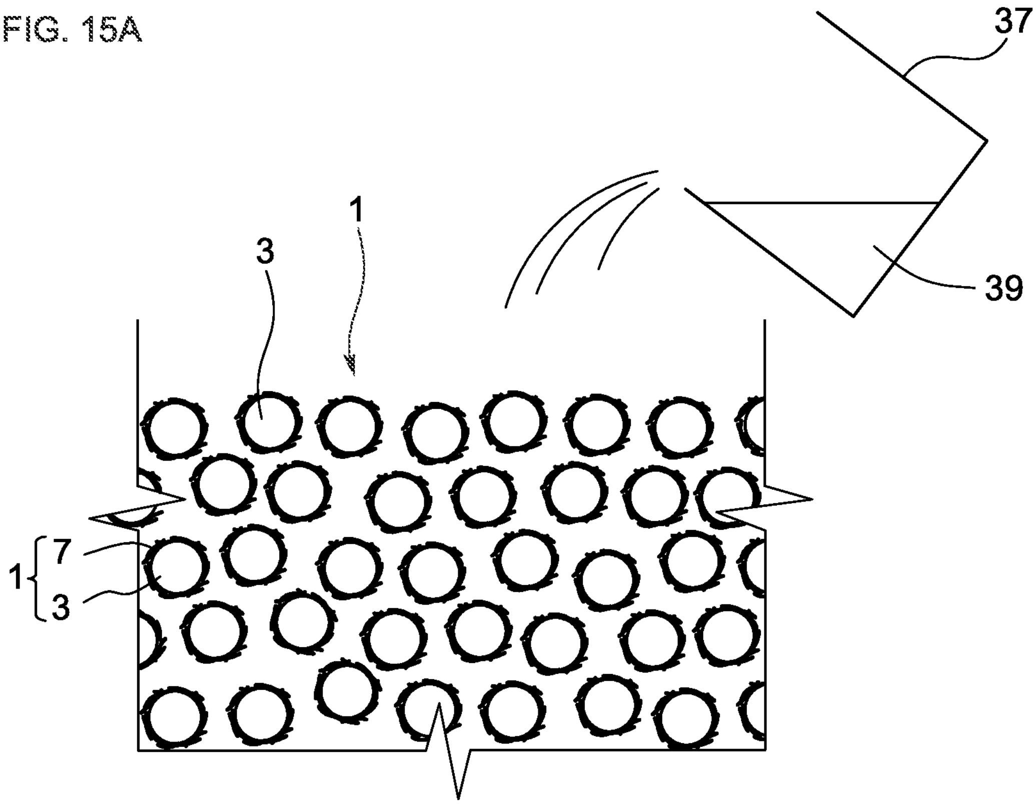
FIG. 15A is a view showing a state in which an epoxy resin is added into a composite material in a method for producing the molded article of the second embodiment.
Figure 15B:
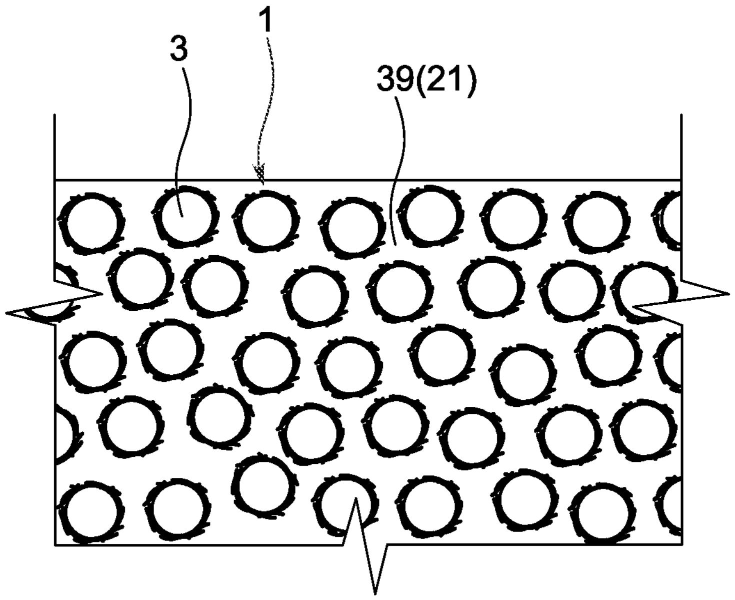
FIG. 15B is a view showing a condition in which an epoxy resin has been added into a composite material.

Next, with reference to FIG. 15A and FIG. 15B, a method for producing the molded article 20 of the second embodiment will be described. As shown in FIG. 15A, from a beaker 37, an epoxy resin 39 is added into a composite material 1. As described above, in this composite material 1, since a structure 7 is formed on the surface of a base material 3, the epoxy resin 39 incorporated into the composite material 1 strongly adhere to the composite material 1, as shown in FIG. 15B. Accordingly, in the molded article 20, the composite material 1 can be prevented from being removed from the surface of the matrix material 21 (epoxy resin 39).

Figure 16A:
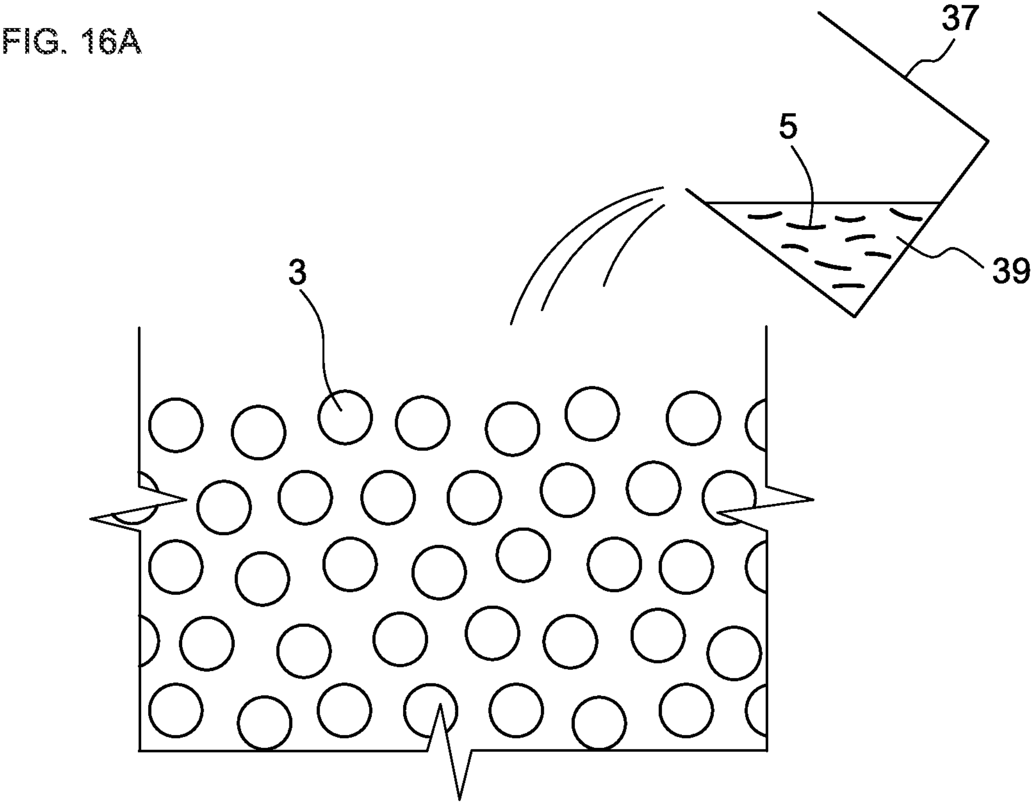
FIG. 16A is a view showing a state in which a CNT composite epoxy resin is added into carbon fibers in a method for producing a conventional fiber-reinforced molded article.
Figure 16B:
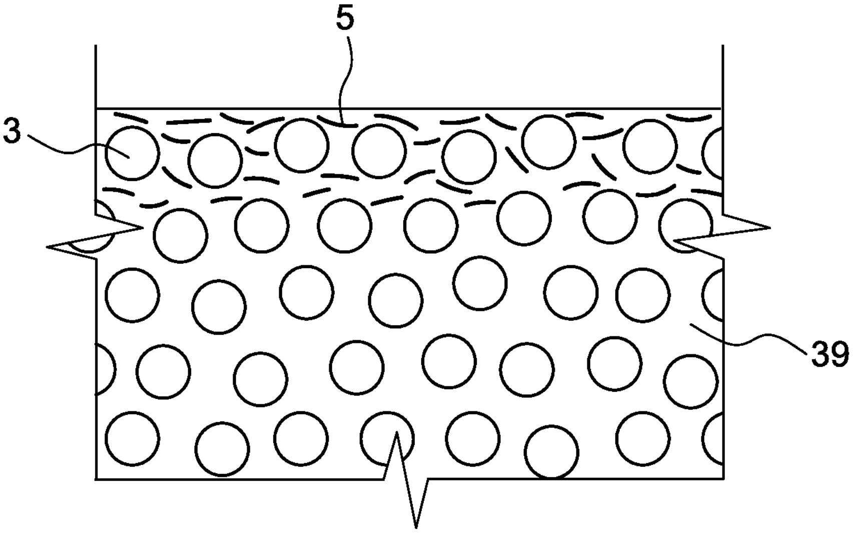
FIG. 16B is a view showing a condition in which a CNT composite epoxy resin has been added into carbon fibers.

Incidentally, FIG. 16A and FIG. 16B are views showing conventional methods for producing a fiber-reinforced molded article. First, as shown in FIG. 16A, from the beaker 37, a solution containing the epoxy resin 39 that is a matrix material and CNTs 5 is added into the base materials 3. Thus, as shown in FIG. 16B, the CNTs 5 are captured by the upper portion of the base materials 3 during filtration, and the CNTs 5 are not present in the lower portion thereof. Moreover, the epoxy resin 39 that impregnated the lower portion of the base materials 3 is allowed to directly come into contact with the base materials 3. Accordingly, the conventional molded article has a structure in which the base materials 3 are easily removed from the surface of the matrix material (epoxy resin 39).

(3) Action and Effects

In the molded article 20, a plurality of base materials 3 are dispersed in the matrix material 21, and a structure 7 formed from a plurality of CNTs 5 is formed on the surface of the base materials 3. The base materials 3 strongly adhere to the matrix material 21 due to the CNTs 5 constituting the structure 7. Thereby, in the molded article 20, the debonding strength between the composite material 1 and the matrix material 21 is improved. In this case, since the concentration of the CNTs 5 constituting the structure 7 is low, the characteristics of the matrix material 21, such as flexibility, are not canceled. Therefore, since the molded article 20 comprises the composite material 1, while the molded article 20 effectively takes advantage of the characteristics of the matrix material 21, such as flexibility and other properties, it can also enhance mechanical strength.

Moreover, in the molded article 20, since the composite material 1 is configured such that the structure 7 has previously adhered to the surface of the base material 3, by impregnating the composite material 1 with a resin that is the matrix material 21, the effect of fiber reinforcement can be obtained throughout the entire molded article 20.

Furthermore, in the molded article 20, even if the density of the composite material 1 is set at high, the structure 7 is sufficiently impregnated with a resin that is the matrix material 21. Therefore, the occurrence of debonding between the composite materials 1 and the matrix material 21 can be prevented.

3. Modification Examples

The present invention is not limited to the above described embodiments. The present invention can be appropriately modified in the range of the gist thereof.

It has been described that the film thickness of the structure 7 is preferably 500 nm or less in the case of the first embodiment. However, the present invention is not limited thereto. Hereafter, a modification example of the structure 7 will be described.

In the composite material 1, or in the molded article 20 in which the composite material 1 is used, if the content of the base material 3 is increased, the total amount of CNTs 5 adhered can be increased, and upon production of the molded article 20, it is also possible to narrow the separation distance between the adjacent base materials 3 by the combined use of a high-pressure press molding production method.

Figure 17A:
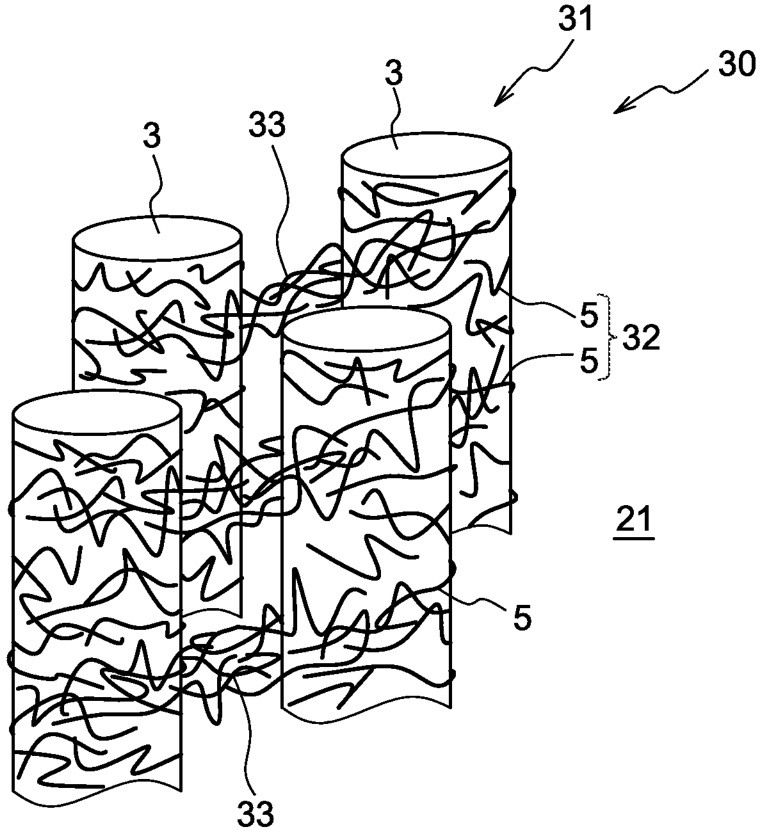
FIG. 17A is a view showing a conceptual configuration of a composite material and a molded article as a modification example.
Figure 17B:
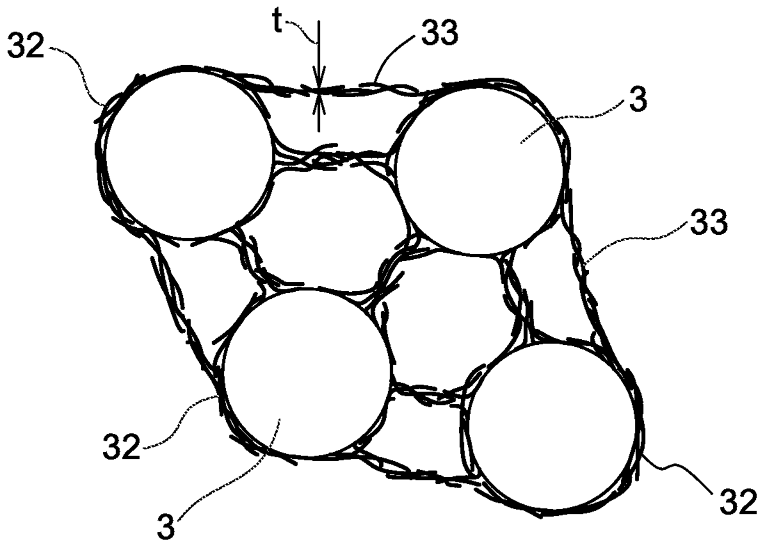
FIG. 17B is a view showing a thickness of a structure from the surface of a base material.
Figure 18:
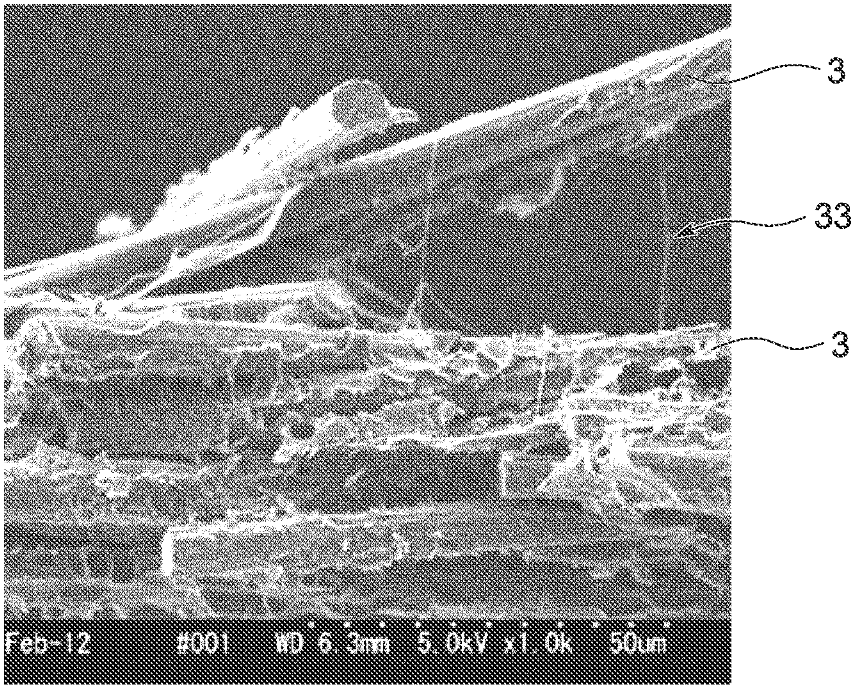
FIG. 18 is an SEM photograph of a composite material as a modification example.

As shown in FIG. 17A, FIG. 17B, and FIG. 18, a molded article 30 comprises a matrix material 21, and a composite material 31 dispersed in the matrix material 21. The composite material 31 according to the present modification example is different from that of the above described first embodiment, in that the content of CNTs 5 to the base materials 3 is larger than that of the first embodiment. Thereby, the composite material 31 has a structure 32 having a film thickness (t) of more than 500 nm. In the molded article 30, connections 33 that are crosslinked are formed in some portions between the adjacent base materials 3. From the connection 33, a further effect of improving the strength of the base material 3 can be obtained. Hereafter, this effect will be described more in detail.

One factor for reducing the strength of a fiber-reinforced molded article comprising the composite material 1 is low adhesion strength obtained between the base material 3 and the matrix material 21. Thus, when the fracture surface of a fiber-reinforced molded article with low strength is observed, portions in which the matrix material 21 is removed from the base material 3 are found. If a connection 33 that is crosslinked is formed, since the connection 33 plays a role for connecting the adjacent base materials 3 with each other, the debonding of the base materials 3 or cracking can be prevented. Thereby, the strength properties of the molded article, including breaking strength and toughness as typical examples, are improved.

In the case of the connection 33 that is crosslinked, the film thickness (t) is not set at an amount in which the connection 33 is protruded from the surface of the base material 3, but the mean value of the thickness from one surface of the connection 33 that is crosslinked to the other surface can be defined as a film thickness (t), as shown in FIG. 17B. The film thickness (t) in such a case becomes 500 nm or less, as with the amount in which the connection 33 is protruded from the surface of the base material 3. The amount in which the connection 33 is protruded from the surface of the base material 3 becomes identical to the thickness from one surface of the connection 33 crosslinked to the other surface for the following reason. That is, since the CNTs 5 used in the present modification example are in an isolated dispersion state, the CNTs 5 closely adhere to the surface of the base material 3 to form the structure 32. Hence, the film thickness (t) of the structure 32 consisting of the CNTs 5 closely adhering to the surface of the base material 3 becomes identical to the thickness from one surface of the connection 33 protruded from the surface of the base material 3 to the other surface.

Figure 19:
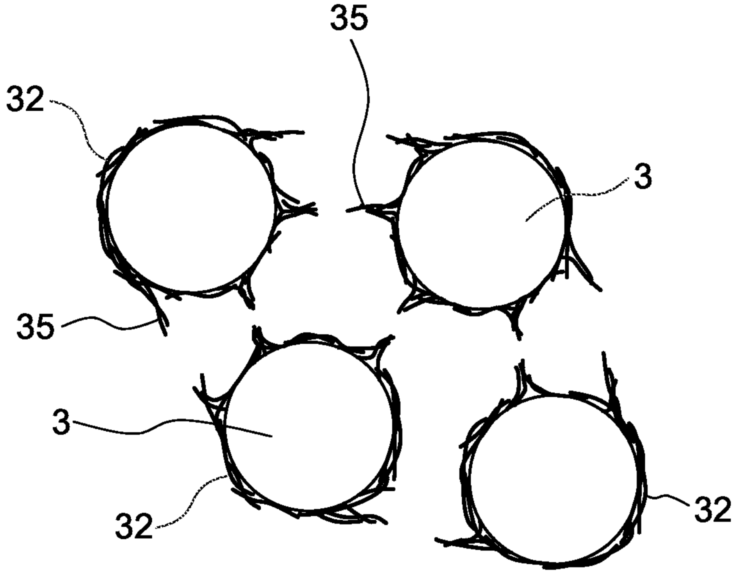
FIG. 19 is a view showing a conceptual configuration of a composite material as another modification example.

Even if the structure 32 does not have a structure for binding a plurality of carbon fibers (the aforementioned connection 33 that is crosslinked), and even if only a portion 35 of the structure 32 is protruded from the surface of the base material 3 while it intertwines with the base material 3, as shown in FIG. 19, the adhesiveness between the base material 3 and the structure 32 can be reinforced by adopting this configuration. This reinforcing effect significantly appears, when a treatment for improving the adhesiveness between the surface of the structure 32 and the base material, etc. is carried out. The network length is not particularly limited at this time.

Moreover, in a step of mixing the matrix material 21 and the composite material 1, some of the structures 32 are peeled from the surface of the base material 3 and float in the matrix material 21. The thus floating structures 32 move with the flow of the resin in a press molding step upon production of a molded article, and are then filled in the voids of the base materials 3, so that they newly form a structure of crosslinking the base materials 3 and they function to improve the strength of the molded article 30.

In the configuration in which the connection 33 that is crosslinked is formed, the occupancy of the base materials 3 per unit cross-sectional area in the molded article 30 is set at 30% or more. If the occupancy of the base materials 3 is less than 30%, the separation distance between the adjacent base materials 3 becomes several tens of μm or more, and as a result, the separation distance between the base materials 3 is too far, and the connection 33 that is crosslinked is hardly formed. In contrast, if the occupancy of the base materials 3 is 30% or more, the separation distance between the adjacent base materials 3 becomes 10 μm or less, and it becomes easy to form the connection 33 that is crosslinked. Hereafter, this will be described more in detail.

When the occupancy of the base materials 3 is in the range of 30% or more and less than 50%, the separation distance between the base materials 3 becomes 3 to 10 μm, and the connection 33 that is crosslinked can be easily obtained. When the occupancy of the base materials 3 is 50% to 70%, the separation distance between the base materials 3 becomes 1 to 3 μm, and the connection 33 that is crosslinked can be more easily obtained. When the occupancy of the base materials 3 is in the range exceeding 70% up to the upper limit of packing of the base materials 3 (in a closely packed state), the connections 33 that is crosslinked are filled at a high density in the voids of the base materials 3, together with the flow of the resin upon molding, and the structure 32 coated on the surface of the base materials 3 is integrated with the matrix material 21. As a result, the strength-improving effect by the connection 33 that is cross-linked is maximized. It is to be noted that such a highly filled state of the base materials 3 can be realized, for example, by high-pressure pressing using a pressing machine or the like.

The above described occupancy of the base materials 3 per unit cross-sectional area in the molded article 30 can be calculated, for example, as follows. Specifically, the fracture surface of the molded article 30 comprising the composite material 1 is observed under an electron microscope such as SEM. In a case where the base material 3 is a short fiber, the direction of the base materials 3 in the molded article 30 becomes random. As such, a visual field in which at least 10 sections of the base materials 3 seem to be closely present in the observed region is extracted, and the occupancy of the base materials 3 per unit cross-sectional area in the extracted visual field is calculated by measurement.

Moreover, in addition to the above-mentioned method, the method for producing the molded article 30 also includes a production method comprising pouring the composite material 31, in which the epoxy resin 39 is filled, into a mold, and then pressing it with a high pressure to mold the molded article 30 of the present invention. Hence, the separation distance between the base materials 3 can be narrowed, and further, the connection 33 crosslinked that has been described above with reference to FIG. 17A, FIG. 17B, and FIG. 18 can be easily formed.

In the above described embodiment, a case in which the base material 3 is a fiber is explained. However, the present invention is not limited to this case, and for example, a product having a particle form, such as activated carbon, is also included in the present invention.

REFERENCE SIGNS LIST

1. Composite material
3. Base material
5. Carbon nanotube
7. Structure
20. Molded article

The invention claimed is:

1. A method for producing a composite material, the method comprising:

preparing a dispersion, in which carbon nanotubes are dispersed without adding a dispersant or an adhesive;

giving mechanical energy to the dispersion to create a reversible reaction condition in the dispersion, in which a dispersion state of the carbon nanotubes and an aggregation state of the carbon nanotubes are constantly generated;

immersing a plurality of carbon fibers in the dispersion that is in the reversible reaction condition to allow the carbon nanotubes to adhere to each surface of the plurality of carbon fibers to form a network structure of the carbon nanotubes on the each surface of the plurality of carbon fibers, wherein a thickness of the network structure of the carbon nanotubes is 500 nm or less; and drawing the plurality of carbon fibers adhered with the carbon nanotubes from the dispersion, followed by drying, to obtain the composite material, wherein each of the carbon fibers is independent from the other carbon fibers, and the one of the carbon fibers does not share its network structure of the carbon nanotubes with the other carbon fibers, in the composite material.

2. The method for producing the composite material according to claim 1, wherein the mechanical energy are ultrasonic waves of 28 kHz and 40 kHz.

* * * * *